(12) United States Patent
Sabi et al.

(10) Patent No.: US 9,362,547 B2
(45) Date of Patent: Jun. 7, 2016

(54) SOLID ELECTROLYTE CELL AND POSITIVE ELECTRODE ACTIVE MATERIAL

(75) Inventors: Yuichi Sabi, Tokyo (JP); Susumu Sato, Miyagi (JP); Saori Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 13/988,702

(22) PCT Filed: Dec. 2, 2011

(86) PCT No.: PCT/JP2011/078502
§ 371 (c)(1),
(2), (4) Date: May 21, 2013

(87) PCT Pub. No.: WO2012/074138
PCT Pub. Date: Jun. 7, 2012

(65) Prior Publication Data
US 2013/0244109 A1    Sep. 19, 2013

(30) Foreign Application Priority Data

Dec. 2, 2010 (JP) .................................. 2010-269090
May 16, 2011 (JP) .................................. 2011-109923
Dec. 1, 2011 (JP) .................................. 2011-263611

(51) Int. Cl.
*H01M 4/131* (2010.01)
*H01M 4/136* (2010.01)
(Continued)

(52) U.S. Cl.
CPC .............. *H01M 4/131* (2013.01); *H01M 4/136* (2013.01); *H01M 4/5825* (2013.01); *H01M 10/0525* (2013.01); *H01M 10/0562* (2013.01); *Y02E 60/122* (2013.01)

(58) Field of Classification Search
CPC ... H01M 4/131; H01M 4/136; H01M 4/5825; H01M 10/0562; H01M 10/0525; Y02E 60/122
See application file for complete search history.

(56) References Cited

U.S. PATENT DOCUMENTS

| | | | |
|---|---|---|---|
| 5,538,814 A | 7/1996 | Kamauchi et al. | |
| 5,705,296 A | 1/1998 | Kamauchi et al. | |

(Continued)

FOREIGN PATENT DOCUMENTS

| | | |
|---|---|---|
| CN | 1875506 | 12/2006 |
| CN | 101361210 | 2/2009 |

(Continued)

OTHER PUBLICATIONS

J.B. Bates et al, "Thin-film lithium and lithium-ion batteries," Solid State Ionics, vol. 135, 2000, pp. 33-45. (13 pages).

Notification of the First Office Action issued in connection with Chinese Patent Application No. 201180056832X, dated Oct. 31, 2014. (19 pages).

*Primary Examiner* — Stewart Fraser
(74) *Attorney, Agent, or Firm* — Chip Law Group; Pramod Chintalapoodi

(57) ABSTRACT

The present technology is able to provide a solid electrolyte cell that uses a positive electrode active material which has a high ionic conductivity in an amorphous state, and a positive electrode active material which has a high ionic conductivity in an amorphous state. The solid electrolyte cell has a stacked body, in which, a positive electrode side current collector film, a positive electrode active material film, a solid electrolyte film, a negative electrode potential formation layer and a negative electrode side current collector film are stacked, in this order, on a substrate. The positive electrode active material film is made up with an amorphous-state lithium phosphate compound that contains Li; P; an element M1 selected from Ni, Co, Mn, Au, Ag, and Pd; and O, for example.

12 Claims, 31 Drawing Sheets

(51) Int. Cl.
*H01M 4/58* (2010.01)
*H01M 10/0525* (2010.01)
*H01M 10/0562* (2010.01)

(56) References Cited

U.S. PATENT DOCUMENTS

| | | |
|---|---|---|
| 8,951,436 B2* | 2/2015 | Hashiba et al. ............ 252/182.1 |
| 8,974,963 B2* | 3/2015 | Isono et al. .................... 429/223 |
| 2006/0040182 A1 | 2/2006 | Kawakami et al. |
| 2007/0031732 A1* | 2/2007 | Chiang et al. ............ 429/231.95 |
| 2009/0061322 A1 | 3/2009 | Kawakami et al. |
| 2009/0162750 A1* | 6/2009 | Kawakami et al. ........ 429/218.1 |
| 2011/0117433 A1* | 5/2011 | Sabi et al. .................... 429/220 |
| 2012/0183857 A1* | 7/2012 | Isono et al. .................... 429/223 |

FOREIGN PATENT DOCUMENTS

| | | |
|---|---|---|
| CN | 101617422 | 12/2009 |
| JP | 06-275277 | 9/1994 |
| JP | 08-162151 | 6/1996 |
| JP | 2001-110455 | 4/2001 |
| JP | 3965657 | 8/2007 |
| JP | 2008-112635 | 5/2008 |
| JP | 2010-135336 | 6/2010 |
| JP | 2010-205718 | 9/2010 |
| JP | 2011-108532 | 6/2011 |
| WO | 2010/090125 | 8/2010 |
| WO | 2011/062113 | 5/2011 |

* cited by examiner

A

B

SOLID ELECTROLYTE CELL AND POSITIVE ELECTRODE ACTIVE MATERIAL

CROSS REFERENCES TO RELATED APPLICATIONS

The present application is a national stage of International Application No. PCT/JP2011/078502 filed on Dec. 2, 2011 and claims priority to Japanese Patent Application No. 2010-269090 filed on Dec. 2, 2010, Application No. 2011-109923 filed on May 16, 2011, and Application No. 2011-263611 filed on Dec. 1, 2011, the disclosure of which is incorporated herein by reference.

BACKGROUND

The present technology relates to a solid electrolyte cell and positive electrode active material. The present technology relates more specifically to a solid electrolyte cell including a solid electrolyte that contains no organic electrolyte solutions, and to a positive electrode active material used for the same.

Lithium-ion secondary cells utilizing doping and dedoping of lithium ions have been widely used in portable electronic apparatus and the like, because of their excellent energy density. Among such lithium-ion secondary cells, energetic research and development efforts have been under way on totally-solid lithium-ion secondary cells using, as an electrolyte, a solid electrolyte that contains no organic electrolyte solutions, from the viewpoint of safety and reliability.

As one form of the totally-solid lithium-ion secondary cells, thin-film lithium secondary cells have been under vigorous development. The thin-film lithium secondary cell is a secondary cell in which a current collector, active material and electrolyte, which make up the cell, are formed by thin films. Each thin film which makes up the thin-film lithium secondary cell is formed by using a film forming method such as sputtering and vapor deposition (e.g., see Non-Patent Document 1).

In a thin-film lithium secondary cell, an amorphous material such as LiPON which is obtained by subjecting $Li_3PO_4$ to substitution by nitrogen and LiBON which is obtained by subjecting $Li_xB_2O_3$ to substitution by nitrogen is used as a solid electrolyte. The ionic conductivity of these amorphous materials is about $10^{-6}$ S/cm which is significantly lower than that of typical liquid electrolytes of $10^{-2}$ S/cm. In the thin-film lithium secondary cell, the film thickness of the solid electrolyte is small (e.g., about 1 μm), and the distance traveled by Li is short. Therefore, the solid electrolyte made of the above amorphous material having a low ionic conductivity can show almost the same performance as liquid electrolytes.

On the other hand, in the thin-film lithium secondary cell, a positive electrode active material is one that limits the rate of the electrical conduction. It is typical to use, as this positive electrode active material, a lithium transition-metal oxide such as $LiCoO_2$, $LiMn_2O_4$ and $LiFePO_4$, as in a liquid-based lithium-ion secondary cell. Further, in addition to these, new lithium transition-metal oxides for use as the positive electrode active material have been proposed. For example, Patent Document 1 proposes a crystalline $LiCu_{1+x}PO_4$ as the lithium transition-metal oxide to be used as the positive electrode active material. These lithium transition-metal oxides (hereinafter referred to as "above-described lithium transition-metal oxides") are materials which are low in ionic conductivity and electron conductivity.

In a thin-film lithium secondary cell, the thickness of the positive electrode active material layer is proportional to the cell capacity, so it is desirable to be as thick as possible in order to achieve a high capacity. However, in the thin-film lithium secondary cell, if the positive electrode active material layer made of a material low in ionic conductivity and electron conductivity is made thicker (e.g., 10 μm or more), it results in a very high internal impedance.

Therefore, it is difficult to commercialize a high-capacity thin-film lithium secondary cell having a thicker positive electrode active material layer, using the above-described lithium transition-metal oxides low in ionic conductivity and electron conductivity.

Besides, the above-described lithium transition-metal oxides are commonly used in a crystalline phase. Therefore, in a thin-film lithium secondary cell, in forming films of the above-described lithium transition-metal oxides, a crystalline phase is formed by such as heating of the substrate during the film formation, and post-annealing after the film formation.

CITATION LIST

Non-Patent Document

Non-Patent Document 1: Thin-Film lithium and lithium-ion batteries, J. B. Bates et al.: Solid State Ionics, 135, 33 (2000)

Patent Document

Patent Document 1: Japanese Patent Publication No. 3965657

SUMMARY

Problem to be Solved by the Invention

However, in a thin-film lithium secondary cell, in cases of performing the heating of the substrate or the post-annealing after the film formation, it is necessary to use a heat-resistant glass, which is expensive, as the substrate, and thus it results in high manufacturing cost. Further, in the thin-film lithium secondary cell, since the materials such as LiPON and LiBON that are used as the solid electrolyte are those which function in an amorphous state, when these materials are annealed, it would lead to degradation of characteristics.

It is thus desirable that the positive electrode active material include a material which may function without being annealed as well, but as lithium transition-metal oxides such as $LiCoO_2$, $LiMn_2O_4$ and $LiFePO_4$ are highly non-crystalline if not annealed, their characteristics as the positive electrode active material are poor. That is, since lithium transition-metal oxides such as $LiCoO_2$, $LiMn_2O_4$ and $LiFePO_4$, if not annealed, have ionic conductivity lower than that of a solid electrolyte such as LiPON, their characteristics as the positive electrode active material are poor.

Accordingly, an object of the present technology is to provide a solid electrolyte cell using a positive electrode active material which functions as such and has a high ionic conductivity in an amorphous state, and a positive electrode active material which has a high ionic conductivity in an amorphous state.

Means for Solving the Problem

In order to solve the problems described above, a first technology is a solid electrolyte cell, including a positive electrode active material and a solid electrolyte. The positive electrode active material includes an amorphous-state lithium phosphate compound containing Li; P; an element M1 selected from Ni, Co, Mn, Au, Ag and Pd; and O.

A second technology is a positive electrode active material including a lithium phosphate compound containing Li; P; an element M1 selected from Ni, Co, Mn, Au, Ag, and Pd; and O. The lithium phosphate compound is in an amorphous state.

A third technology is a solid electrolyte cell, including a positive electrode active material and a solid electrolyte. The positive electrode active material includes an amorphous-state lithium phosphate compound containing Li; P; an element M1' selected from Ni, Co, Mn, Au, Ag, Pd and Cu; at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr; and O.

A fourth technology is a positive electrode active material including a lithium phosphate compound containing Li; P; an element M1' selected from Ni, Co, Mn, Au, Ag, Pd and Cu; at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr; and O. The lithium phosphate compound is in an amorphous state.

A fifth technology is a solid electrolyte cell, including a positive electrode active material and a solid electrolyte. The positive electrode active material includes an amorphous-state lithium phosphate compound. The lithium phosphate compound is one which is represented by Formula (2).

$Li_xCu_yPO_4$        Formula (2)

(where x represents the composition ratio of lithium; y represents the composition ratio of copper; and x is 5.0<x<7.0)

A sixth technology is a positive electrode active material including a lithium phosphate compound represented by Formula (2). The lithium phosphate compound is in an amorphous state.

$Li_xCu_yPO_4$        Formula (2)

(where x represents the composition ratio of lithium; y represents the composition ratio of copper; and x is 5.0<x<7.0)

According to the present technology, a positive electrode active material includes an amorphous-state lithium phosphate compound containing Li; P; an element M1 selected from Ni, Co, Mn, Au, Ag and Pd; and O. Further, a positive electrode active material includes an amorphous-state lithium phosphate compound, and the lithium phosphate compound includes an amorphous-state lithium phosphate compound containing Li; P; an element M1' selected from Ni, Co, Mn, Au, Ag, Pd and Cu; and O; and at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr. Still further, a positive electrode active material includes an amorphous-state lithium phosphate compound, and the lithium phosphate compound is one which is represented by the above-mentioned Formula (2). These lithium phosphate compounds in an amorphous state may function as the positive electrode active material having a high ionic conductivity in an amorphous state.

Effect of the Invention

According to the present technology, it is able to provide a solid electrolyte cell using a positive electrode active material which has a high ionic conductivity in an amorphous state, and a positive electrode active material which has a high ionic conductivity in an amorphous state.

Additional features and advantages are described herein, and will be apparent from the following Detailed Description and the figures.

DETAILED DESCRIPTION

Figure 1:
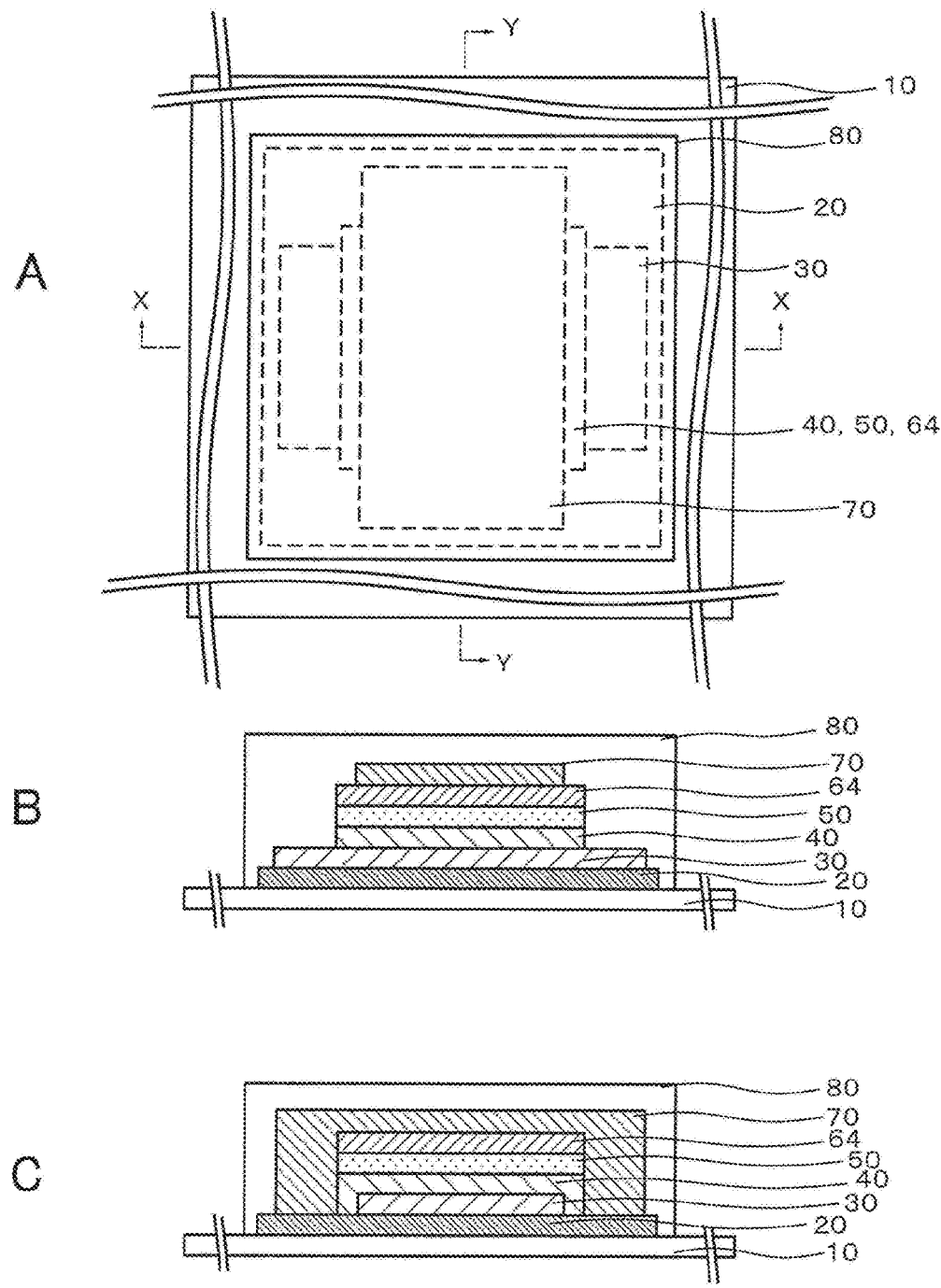
FIG. 1A is a plan view of a solid electrolyte cell according to a first embodiment of the present technology.
FIG. 1B is a cross-sectional view taken along the line X-X shown in FIG. 1A.
FIG. 1C is a cross-sectional view taken along the line Y-Y shown in FIG. 1A.

Embodiments of the present technology will be described with reference to the drawings. The description will be given in the following order. In all the drawings of the embodiments, the same or corresponding parts will be denoted by the same reference numerals.

1. First Embodiment (First Example of Solid Electrolyte Cell)
2. Second Embodiment (Second Example of Solid Electrolyte Cell)
3. Other Embodiments (Modified Examples)

1. First Embodiment

FIG. 1 shows a configuration of a solid electrolyte cell according to a first embodiment of the present technology. This solid electrolyte cell is, for example, a solid electrolyte secondary cell capable of being charged and discharged. FIG. 1A is a plan view of this solid electrolyte cell. FIG. 1B is a cross-sectional view taken along the line X-X shown in FIG. 1A. FIG. 1C is a cross-sectional view taken along the line Y-Y shown in FIG. 1A.

As shown in FIG. 1, this solid electrode cell has an inorganic insulating film 20 formed on a substrate 10, and a stacked body, in which, a positive electrode side current collector film 30, a positive electrode active material film 40, a solid electrolyte film 50, a negative electrode potential formation layer 64 and a negative electrode side current collector film 70 are stacked in this order, on the inorganic insulating film 20. An overall protective film 80 made up of a UV-curing resin, for example, is formed in such a manner as to cover the whole part of this stacked body. It should be noted that alternatively the inorganic insulating film 20 may be formed on the overall protective film 80. This solid electrode cell is one including a positive electrode side layer, a negative electrode side layer and a solid electrolyte layer that is between the positive electrode side layer and the negative electrode side layer. In this solid electrolyte cell, with respect to the solid electrolyte layer as a boundary, the positive electrode side layer is located on the positive electrode side of the solid electrolyte layer. In the example shown in FIG. 1, the positive electrode side layer includes the positive electrode active material film 40 which is a positive electrode active material layer, and the positive electrode side current collector film 30 which is a positive electrode current collector layer, being located on the positive electrode side of the solid electrolyte film 50 which is the solid electrolyte layer, for example. In this solid electrolyte cell, with respect to the solid electrolyte layer as a boundary, the negative electrode side layer is located on the negative electrode side of the solid electrolyte layer. In the example shown in FIG. 1, the negative electrode side layer includes the negative electrode potential formation layer 64 and the negative electrode side current collector film 70 which is a negative electrode current collector layer, being located on the negative electrode side of the solid electrolyte film 50 which is the solid electrolyte layer, for example.

(Substrate)

Examples of substrates which can be used as the substrate 10 include polycarbonate (PC) resin substrate, fluorine resin substrate, polyethylene terephthalate (PET) substrate, polybutylene terephthalate (PBT) substrate, polyimide (PI) substrate, polyamide (PA) substrate, polysulfone (PSF) substrate, polyethersulfone (PES) substrate, polyphenylene sulfide (PPS) substrate, polyetheretherketone (PEEK) substrate, polyethylene naphthalate (PEN), cycloolefin polymer (COP) and the like. The material of this substrate is not especially restricted, and is more desirable to be a substrate which is of low hygroscopicity and has moisture resistance.

(Positive Electrode Side Current Collector Film 30)

Examples of materials which can be used to make up the positive electrode side current collector film 30 include Cu, Mg, Ti, Fe, Co, Ni, Zn, Al, Ge, In, Au, Pt, Ag, Pd and the like, as well as alloys containing any of these.

(Positive Electrode Active Material Film 40)

The positive electrode active material film 40 is made up with an amorphous-state lithium phosphate compound. For example, the positive electrode active material film 40 is made up with an amorphous-state lithium phosphate compound that contains Li; P; an element M1 selected from Ni, Co, Mn, Au, Ag, and Pd; and O.

This lithium phosphate compound has the following excellent characteristics as a positive electrode active material. That is to say, it has a high potential relative to Li$^+$/Li pair. It is superior in flatness of potential, that is, variation of its potential resulting from composition changes is small. The composition ratio of lithium is larger, so it has a high capacity. It has a high electric conductivity. It is superior in charge-discharge cycle characteristics because it is free from such matters as collapse of crystalline structure due to repetition of charging and discharging, unlike crystalline positive electrode active materials. Further, it can be formed without being annealed, so it enables simplification of the process, improvement in yield, and utilization of a resin substrate.

The positive electrode active material film 40 may be made up with a lithium phosphate compound represented by Formula (1) as such a lithium phosphate compound as described above, for example.

$$Li_xNi_yPO_z \qquad \text{Formula (1)}$$

(where x represents the composition ratio of lithium; y represents the composition ratio of nickel; x is 0<x<8.0; y is 2.0≤y≤10; z represents the composition ratio of oxygen; and z is the ratio in which oxygen is stably contained depending on the composition ratio of Ni and P)

In Formula (1), a desirable range of the composition ratio x of lithium is 0<x<8. The upper limit of the composition ratio x of lithium is not especially restricted; and the limit at which the potential can be maintained becomes the upper limit of the composition ratio x of Li. As far as could be confirmed, the composition ratio x of Li is desirable to be less than 8. Further, the range of the composition ratio x of lithium is more desirable to be 1.0≤x<8. This is because if the composition ratio x of lithium is less than 1.0, the impedance becomes larger and it would be unable to charge and discharge.

In Formula (1), a desirable range of the composition ratio y of Ni, from the point that sufficient charge and discharge capacity can be achieved, is 2.0≤y≤10.0. For example, if the composition ratio y of Ni is less than 2.0, the charge and discharge capacity would be drastically decreased. The upper limit of the composition ratio y of Ni is not especially restricted; but if the composition ratio y of Ni is more than 4, the charge and discharge capacity would be gradually lowered. Setting about a half of the maximum capacity as an index, the composition ratio y of Ni is desirable to be 10 or less. However, in cases where it would have an advantage with regard to durability, ionic conductivity or the like, the composition ratio may be more than 10.0, at the sacrifice of the charge and discharge capacity.

In Formula (1), the composition ratio z of oxygen is the ratio to be stably contained depending on the composition ratio of Ni and P.

The positive electrode active material film 40 may be made up with an amorphous-state lithium phosphate compound represented by Formula (2).

$$Li_xCu_yPO_4 \quad \text{Formula (2)}$$

(where x represents the composition ratio of lithium; and y represents the composition ratio of copper)

An amorphous-state lithium phosphate compound represented by Formula (2) has the following excellent characteristics as a positive electrode active material. That is to say, it has a high potential relative to $Li^+/Li$ pair. It is superior in flatness of potential, that is, variation of its potential resulting from composition changes is small. The composition ratio of lithium is larger, so it has a high capacity. It has a high electric conductivity. It is superior in charge-discharge cycle characteristics because it is free from such matters as collapse of crystalline structure due to repetition of charging and discharging, unlike crystalline positive electrode active materials. Further, it can be formed without being annealed, so it enables simplification of the process, improvement in yield, and utilization of a resin substrate.

In the lithium phosphate compound represented by Formula (2), for example, the range of the composition ratio x of lithium is $0.5 \leq x < 7.0$, and it may be $5 < x < 7.0$.

In the lithium phosphate compound represented by Formula (2), a desirable range of the composition ratio y of copper, from the point that sufficient charge and discharge capacity can be achieved, is $1.0 \leq y \leq 4.0$. In particular, if the composition ratio y of copper is less than 1.0, the charge and discharge capacity would be drastically decreased. The least upper bound of the composition ratio y of copper is not especially restricted; but if the composition ratio y is more than 3, the charge and discharge capacity would be gradually lowered. Setting about a half of the maximum capacity as an index, the composition ratio y is desirable to be 4 or less. However, in cases where it would have an advantage with regard to durability, ionic conductivity or the like, the composition can be 4 or more, at the sacrifice of the charge and discharge capacity. Further, in the lithium phosphate compound represented by Formula (2), from the point that good charge-discharge cycle characteristics can be obtained, the lower limit of the composition ratio y of copper is more desirable to be $2.2 \leq y$.

Meanwhile, in order to improve energy density in secondary cells, it is essential to increase the capacity of the positive electrode active material. Examples of high-capacity positive electrode active materials include metal complex oxides (such as $Li_xCoO_2$, $Li_xNiO_2$ and $Li_xMn_2O_4$) which may be broadly classified into rock salt layer structure and spinel structure; thus to increase the capacity.

However, in these positive electrode active materials, for having crystalline structure, structural collapse proceeds along with the number of cycles; and for having high internal impedance, it is difficult to increase the number of reaction electrons. Further, it is known that in cases of $Li_xMn_2O_4$ which is classified in spinel structure, if it is containing an excess of Li in the active material, at $1<X<2$, the potential lowers due to the volume expansion and contraction caused by Jahn Teller ion ($Mn^{3+}$). (For example, see J. M. Tarascon, J. Electrochem. Soc, 138, 2864 (1991); and T. Ohzuku, J. Electrochem. Soc, 137, 769 (1990))

In contrast to this, the positive electrode active material of the present technology is capable of driving the cell to charge and discharge, in an amorphous state; and reducing the volume expansion and contraction due to insertion and desorption of Li, which can suppress structural changes. Further, the positive electrode active materials of the present technology such as those of the above Formulae (1) and (2), for example, can have wide range of content of Li, and thus the capacity can be increased. For example, in Formula (1), lithium can be contained up to the composition ratio x of less than x=8; and in Formula (2), lithium can be contained up to the composition ratio x of less than x=7.

In addition, in totally-solid secondary cells, because it is necessary to deposit a current collector, a positive electrode active material, an electrolyte and a negative electrode, it is essential to reduce interfacial resistance and reduce the internal resistance of the positive electrode active material. Formation of lithium-ion pathway contributes to the interfacial resistance. The easier the diffusion of Li ions is, the further the interfacial resistance can be reduced. While improving ionic conductivity of the electrolyte is a major solution, interfacial control of such as surface uniformity and adhesion property of the layers also can lead to improvement of the characteristics. With regard to the internal resistance of the positive electrode active material, it is unable to be made in thicker film unless the internal impedance is lowered. In cases of totally-solid secondary cells, since the film thickness is proportional to the cell capacity, the positive electrode active material should be formed in a thick film. Accordingly, reducing of the internal impedance of the positive electrode may lead to the increase of the capacity. The positive electrode active material of the present technology is found to have the internal impedance lower than that of $LiCoO_2$ having a layered structure.

The positive electrode active material film 40 may be made up with an amorphous-state lithium phosphate compound that contains Li; P; an element M1 selected from Ni, Co, Mn, Au, Ag, and Pd; at least one element M2 selected from Ni, Co, Mn, Au, Ag, Pd and Cu (provided M1≠M2); and O. Such a lithium phosphate compound can provide the positive electrode active material with better characteristics, for example, by appropriately selecting the elements M1 and M2. For example, in cases where the positive electrode active material film 40 is made up with the amorphous-state lithium phosphate compound containing Li, P, Ni (the element M1), Cu (the element M2) and O, the charge-discharge cycle characteristics can be further improved. In cases where the positive electrode active material film 40 is made up with the amorphous-state lithium phosphate compound containing Li, P, Ni (the element M1), Pd (the element M2) and O, the capacity can be further increased and the charge-discharge cycle characteristics can be further improved. In cases where the positive electrode active material film 40 is made up with the amorphous-state lithium phosphate compound containing Li, P, Ni (the element M1), Au (the element M2) and O, the charge-discharge cycle characteristics can be further improved.

The positive electrode active material film 40 may be made up with an amorphous-state lithium phosphate compound that contains Li; P; an element M1 selected from Ni, Co, Mn, Au, Ag, and Pd; at least one element M2 selected from Ni, Co, Mn, Au, Ag, Pd and Cu (provided M1≠M2); at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr; and O.

The positive electrode active material film 40 may be made up with an amorphous-state lithium phosphate compound that contains Li; P; an element M1' selected from Ni, Co, Mn, Au, Ag, Pd and Cu; at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr; and O.

When the additive element M3 is contained in a lithium phosphate compound alone, this lithium phosphate compound may not be used as the positive electrode active material. That is, in cases where the positive electrode active material film 40 was made up with an amorphous-state lithium phosphate compound that contains Li, P, the additive element M3 alone and O, the cell would not be driven. On the other hand, in cases where the additive element M3 is contained in a lithium phosphate compound together with the elements M1 and M2 (M1≠M2) or with the element M1', this lithium phosphate compound can be used as the positive electrode active material. Moreover, by the selection of the element species to be added, the characteristics as the positive electrode active material can be improved. That is, also in cases where the positive electrode active material film 40 is made up with the lithium phosphate compound that contains the additive element M3 together with the elements M1 and M2 (M1≠M2) or with the element M1', it does not affect driving of the cell. Moreover, in cases where the positive electrode active material film 40 is made up with the lithium phosphate compound that contains the additive element M3 together with the elements M1 and M2 (M1≠M2) or with the element M1', it has the effect such as improvement of the capacity, the cycle characteristics or the like, or lowering of the internal impedance, by the selection of the element species to be added.

Examples of desirable additive elements M3 would be the following. That is, for ionic conductivity in general, it is believed that by disturbing the structure having conductivity, ions become easier to move. In fact, it is known that by subjecting a $Li_3PO_4$ solid electrolyte to nitrogen doping, and substituting by nitrogen a part thereof, as in $Li_3PO_{3.7}N_{0.3}$, the ionic conductivity can be increased. On the other hand, in cases of crystalline materials, a technique which is employed to increase the ionic conductivity is that the conducting path of ions is formed in a structure (crystal) as orderly as possible, and a part of the material inside the crystal is substituted to generate holes. Therefore, these techniques have a commonality from the viewpoint of adding the path for lithium to easily move inside the solid electrolyte, and a material whose ionic conductivity was increased in crystalline material form is often effective in amorphous material form as well. Thus, the additive (additive element) for such a material whose ionic conductivity was increased would be effective in the amorphous positive electrode active material of the present technology (amorphous-state lithium phosphate compound) as well. Examples of materials of lithium oxide solid electrolyte, which are the materials whose ionic conductivity was increased in crystalline material form, include $Li_{1.3}Al_{0.3}Ti_{1.7}(PO_4)_3$ (LATP), and in addition to this, $Li_{0.5}La_{0.5}TiO_3$, $Li_{3.5}Zn_{0.35}GeO_4$ and many other materials. Therefore, the additive elements of these materials Al, Ti, La, Zn, Ge and other Si, V, W, Ga, Ta, Zr, Cr and Pd would be effective as well in the amorphous positive electrode active material of the present technology, being capable of further improving the characteristics such as ionic conductivity.

For example, in cases where the positive electrode active material film 40 is made up with the amorphous-state lithium phosphate compound containing Li, P, Ni (the element M1'), at least one of Al and Ti (the additive element M3) and O, the internal impedance can be lowered and excellent high-rate discharge characteristics can be obtained. By the internal impedance decreased, the potential change at the time of high-speed discharge can be reduced and thus can realize the cell with the higher potential. In addition, by the internal impedance being low, the ratio of the discharge energy and charge energy (discharge energy/charge energy) becomes close to 1, and thus it is expected to have the effects that energy loss decreases and energy efficiency becomes higher, as well as that the Joule heat during charge and discharge can be reduced and heat generation can be suppressed.

The positive electrode active material film 40 is a completely single-phase amorphous thin film which does not include crystalline phase. The positive electrode active material film 40 can be confirmed to be single-phase amorphous by an observation of the cross-section with a transmission electron microscope (TEM). That is, when the cross-section of this positive electrode active material film 40 is observed with a transmission electron microscope (TEM), a state in which crystal grains do not exist can be confirmed in the TEM image. This state can also be confirmed from an electron beam diffraction image.

(Solid Electrolyte Film 50)

Examples of materials which can be used to make up the solid electrolyte film 50 include lithium phosphate ($Li_3PO_4$), $Li_3PO_{4-x}N_x$ (generally called "LiPON") obtained by addition of nitrogen to lithium phosphate ($Li_3PO_4$), $Li_xB_2O_{3-y}N_y$, $Li_4SiO_4$—$Li_3PO_4$, $Li_4SiO_4$—$Li_3VO_4$ and the like.

(Negative Electrode Potential Formation Layer 64)

As the negative electrode potential formation layer 64, for example, an oxide containing at least one selected from Mn, Co, Fe, P, Ni, and Si can be used. Specific examples of the oxides include $LiCoO_2$, $LiMn_2O_4$ and the like. In this solid electrolyte cell, a negative electrode active material layer is not formed at the time of manufacturing, and the negative electrode potential formation layer 64 is formed instead of this. What is formed on the negative electrode side is Li metal or a layer containing an excess of Li (hereinafter referred to as the "Li excess layer") at an interface on the negative electrode side of the solid electrolyte film 50. While utilizing the excessively deposited Li (Li excess layer), without spoiling the charge-discharge characteristics, it has a high durability against repetition of charging and discharging.

Although the negative electrode potential formation layer 64 takes in some of Li during initial charging of the cell, the Li content is maintained at a constant level during the subsequent process of charging and discharging, and due to this, diffusion of Li into the negative electrode side current collector film 70 is suppressed and deterioration of the negative electrode side current collector film 70 is prevented.

Thus, extremely good repetitive charge-discharge characteristics can be achieved. Further, a loss of charging amount due to diffusion of Li into the negative electrode side current collector film 70 can be minimized effectively. If the negative electrode potential formation layer 64 was not provided, Li would diffuse into the negative electrode side current collector film 70, and the total amount of Li which accompanies charge and discharge of the cell cannot be maintained at a constant level, and thus, charge-discharge characteristics would be deteriorated.

Incidentally, the thickness of the Li excess layer formed at the interface on the negative electrode side of the solid electrolyte film 50 varies in accordance with the thickness of the positive electrode active material film 40. However, the negative electrode potential formation layer 64 has only to be fully functional as a protective film to the Li excess layer formed at the interface on the negative electrode side of the solid electrolyte film 50. Therefore, the thickness of the negative electrode potential formation layer 64 is not directly related to the thickness of the Li excess layer, and does not depend on the thickness of the positive electrode active material film 40.

This solid electrolyte cell utilizes the fact that if the capacity of a negative electrode active material is less than the amount of Li in the positive electrode active material, Li that could not fit in the negative electrode active material is deposited on the interface to form the Li excess layer, to thereby function as the negative electrode active material. In the solid electrolyte cell, the negative electrode potential formation layer 64 is formed to be sufficiently thinner than the positive electrode active material film 40, so that the negative electrode active material is substantially absent in an uncharged state.

The negative electrode potential formation layer 64 may be made of a material which is utilized as the negative electrode active material. In such cases, more precisely, a part of the material functions as the negative electrode active material and the rest of the material functions as a protective film to the Li excess layer. In cases where the negative electrode potential formation layer 64 is sufficiently thinner than the positive electrode active material film 40, most part of the negative electrode potential formation layer 64 is used as the protective film.

This solid electrolyte cell has a configuration in which the negative electrode potential formation layer 64 is formed to be sufficiently thinner than the positive electrode active material film 40 so that the Li excess layer, which is formed by deposition on the interface and which functions as the negative electrode active material, accounts for not less than one half of driving of the cell.

(Negative Electrode Side Current Collector Film 70)

Examples of materials which can be used to make up the negative electrode side current collector film 70 include Cu, Mg, Ti, Fe, Co, Ni, Zn, Al, Ge, In, Au, Pt, Ag, Pd and the like, as well as alloys containing any of these.

(Inorganic Insulating Film 20)

The material which makes up the inorganic insulating film 20 may be any material that can form a film which is of low hygroscopicity and has moisture resistance. Examples of such materials include oxides, nitrides and sulfides of any of Si, Cr, Zr, Al, Ta, Ti, Mn, Mg, and Zn, which can be used either singly or as mixtures of two or more thereof. More specific examples of the materials, which may be used, include $Si_3N_4$, $SiO_2$, $Cr_2O_3$, $ZrO_2$, $Al_2O_3$, $TaO_2$, $TiO_2$, $Mn_2O_3$, MgO, ZnS and the like, and mixtures thereof.

(Method of Manufacturing Solid Electrolyte Cell)

The solid electrolyte cell described above is manufactured, for example, in the following manner.

First, an inorganic insulating film 20 is formed on a substrate 10. Next, a positive electrode side current collector film 30, a positive electrode active material film 40, a solid electrolyte film 50, a negative electrode potential formation layer 64, and a negative electrode side current collector film 70 are sequentially formed over the inorganic insulating film 20, to thereby form a stacked body. Subsequently, an overall protective film 80 made of a UV-curing resin, for example, is formed over the substrate (organic insulating substrate) 10 so as to cover the whole part of this stacked body and inorganic insulating film 20. By the series of steps described above, a solid electrolyte cell according to the first embodiment of the present technology can be formed.

(Methods for Forming Thin Films)

Methods for forming the inorganic insulating film 20, the positive electrode side current collector film 30, the positive electrode active material film 40, the solid electrolyte film 50, the negative electrode potential formation layer 64 and the negative electrode side current collector film 70 will be described.

Each of the thin films can be formed, for example, by a vapor phase method such as PVD (Physical Vapor Deposition) and CVD (Chemical Vapor Deposition). Besides, the thin films can be formed by a liquid phase method such as electroplating, electroless plating, coating, and a sol-gel method. Furthermore, the thin films can be formed by a solid phase method such as SPE (solid phase epitaxy) and the LB (Langmuir-Blodgett) method.

The PVD method is a method in which a raw material to be formed into a thin film is once evaporated or vaporized by energy such as heat or plasma, and is deposited as a thin film on a substrate. Examples of the PVD methods include vacuum evaporation, sputtering, ion plating, MBE (molecular beam epitaxy), and laser ablation, and the like.

The CVD method is a method in which a component material of the thin film provided as a gas is subjected to energy such as heat, light or plasma to form decomposition products, reaction products and/or intermediate products with the molecules of the material gas; so that a thin film is deposited on a substrate through adsorption, reaction and desorption at a surface of the substrate.

Examples of the CVD methods include thermal CVD, MOCVD (Metal Organic Chemical Vapor Deposition), RF plasma CVD, photo-CVD, laser CVD, LPE (liquid phase epitaxy), and the like.

It is easy for those skilled in the art to form the inorganic insulating film 20, the positive electrode side current collector film 30, the positive electrode active material film 40, the solid electrolyte film 50, the negative electrode potential formation layer 64 and the negative electrode side current collector film 70 of a desired configuration by the above-mentioned methods for forming thin films. That is, by appropriately selecting the raw materials, the methods and the conditions for forming thin films, or the like, those skilled in the art can easily form the inorganic insulating film 20, the positive electrode side current collector film 30, the positive electrode active material film 40, the solid electrolyte film 50, the negative electrode potential formation layer 64 and the negative electrode side current collector film 70 of a desired configuration.

(Effects)

In the first embodiment of the present technology, the positive electrode active material film 40 is made up with a lithium phosphate compound that contains Li; P; an element M1 selected from Ni, Co, Mn, Au, Ag, and Pd; and O; which lithium phosphate compound is in an amorphous-state. This makes it possible to obtain a solid electrolyte cell having excellent characteristics.

In addition, in the first embodiment of the present technology, the positive electrode active material film 40 is able to function as a positive electrode active material even when it is not annealed. This eliminates the need to use an expensive heat-resistant glass as the substrate 10, and thus the manufacturing cost of the solid electrolyte cell can be reduced.

2. Second Embodiment

Figure 2:
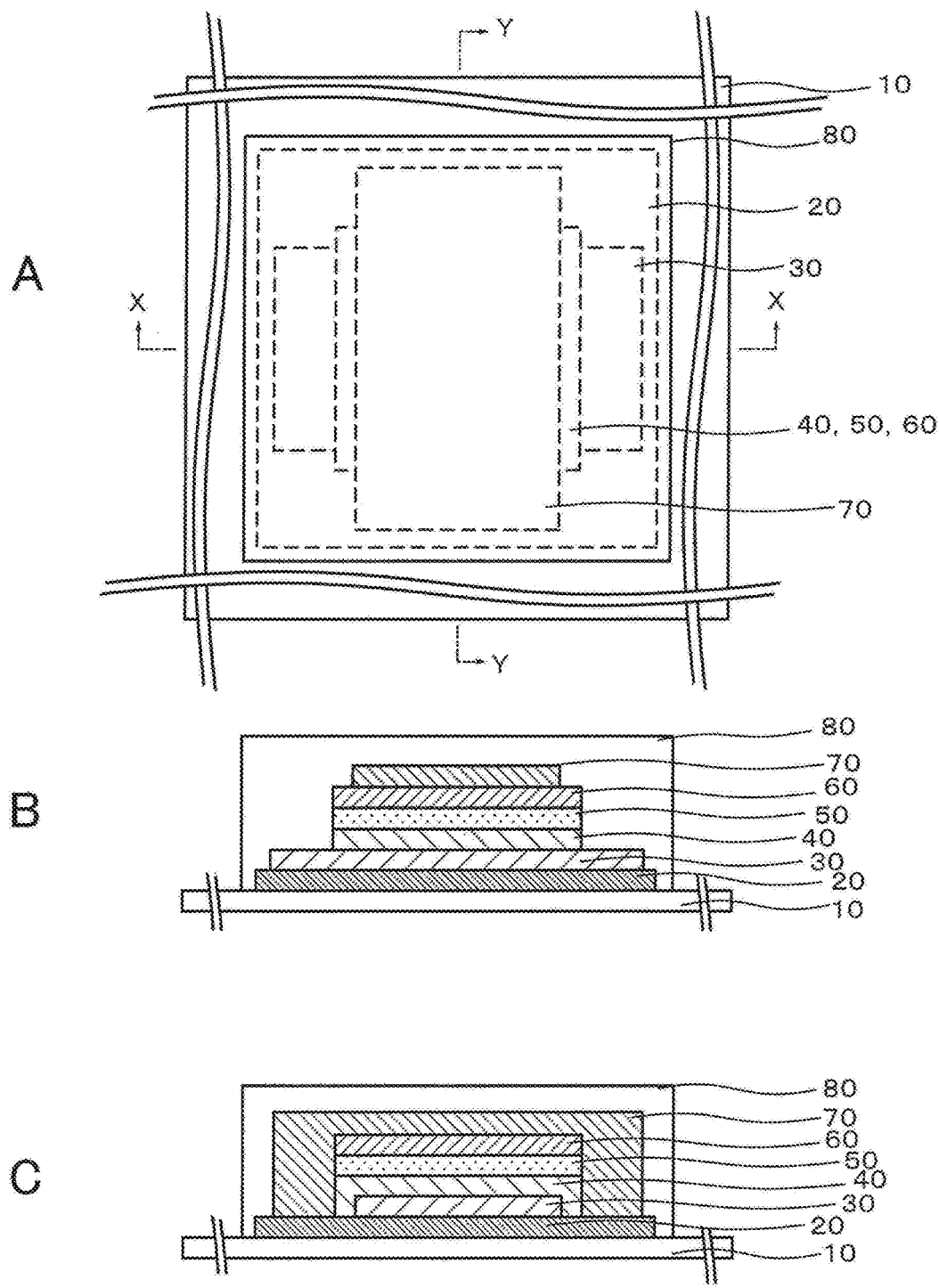
FIG. 2A is a plan view of a solid electrolyte cell according to a second embodiment of the present technology.
FIG. 2B is a cross-sectional view taken along the line X-X shown in FIG. 2A.
FIG. 2C is a cross-sectional view taken along the line Y-Y shown in FIG. 2A.

A solid electrolyte cell according to a second embodiment of the present technology will now be described. This solid electrolyte cell is, for example, a solid electrolyte secondary cell capable of being charged and discharged. FIG. 2 shows a configuration of a solid electrolyte cell according to a second embodiment of the present technology. FIG. 2A is a plan view of this solid electrolyte cell. FIG. 2B is a cross-sectional view taken along the line X-X shown in FIG. 2A. FIG. 2C is a cross-sectional view taken along the line Y-Y shown in FIG. 2A.

This solid electrode cell has an inorganic insulating film 20 formed on a substrate 10, and a stacked body, in which, a positive electrode side current collector film 30, a positive electrode active material film 40, a solid electrolyte film 50, a negative electrode active material film 60 and a negative electrode side current collector film 70 are stacked in this order, on the inorganic insulating film 20. An overall protective film 80 made up of a UV-curing resin, for example, is formed in such a manner as to cover the whole part of this stacked body and inorganic insulating film. It should be noted that alternatively the inorganic insulating film 20 may be formed on the overall protective film 80. This solid electrode cell is one including a positive electrode side layer, a negative electrode side layer and a solid electrolyte layer that is between the positive electrode side layer and the negative electrode side layer. In this solid electrolyte cell, with respect to the solid electrolyte layer as a boundary, the positive electrode side layer is located on the positive electrode side of the solid electrolyte layer. In the example shown in FIG. 2, the positive electrode side layer includes the positive electrode active material film 40 which is a positive electrode active material layer, and the positive electrode side current collector film 30 which is a positive electrode current collector layer, being located on the positive electrode side of the solid electrolyte film 50 which is the solid electrolyte layer, for example. In this solid electrolyte cell, with respect to the solid electrolyte layer as a boundary, the negative electrode side layer is located on the negative electrode side of the solid electrolyte layer. In the example shown in FIG. 2, the negative electrode side layer includes the negative electrode active material film 60 and the negative electrode side current collector film 70 which is a negative electrode current collector layer, being located on the negative electrode side of the solid electrolyte film 50 which is the solid electrolyte layer, for example.

The substrate 10, the inorganic insulating film 20, the positive electrode side current collector film 30, the positive electrode active material film 40, the solid electrolyte film 50, the negative electrode side current collector film 70 and the overall protective film 80 are the same as in the first embodiment. Therefore, detail descriptions thereof will be omitted. The negative electrode active material film 60 has the following configuration.

(Negative Electrode Active Material Film)

The material which makes up the negative electrode active material film 60 may be any material that is capable of easily intercalating and de-intercalating lithium ions, which allows a large amount of lithium ions to be intercalated into and de-intercalated from the negative electrode active material film. As such a material, an oxide of any of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, Zn and the like can be used. In addition, mixtures of these oxides can also be used.

Specific examples of the materials for the negative electrode active material film 60 include silicon-manganese alloy (Si—Mn), silicon-cobalt alloy (Si—Co), silicon-nickel alloy (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), Sn-doped indium oxide (ITO), Al-doped zinc oxide (AZO), Ga-doped zinc oxide (GZO), Sn-doped tin oxide (ATO), F (fluorine)-doped tin oxide (FTC)) and the like. In addition, mixtures of these can also be used. Further, Li metal may also be used as the material to make up the negative electrode active material film 60.

(Method of Manufacturing Solid Electrolyte Cell)

The solid electrolyte cell described above is manufactured, for example, in the following manner.

First, an inorganic insulating film 20 is formed on a substrate 10. Next, a positive electrode side current collector film 30, a positive electrode active material film 40, a solid electrolyte film 50, a negative electrode active material film 60, and a negative electrode side current collector film 70 are sequentially formed over the inorganic insulating film 20, to thereby form a stacked body. Subsequently, an overall protective film 80 made of a UV-curing resin, for example, is formed over the substrate 10 so as to cover the whole part of this stacked body and inorganic insulating film 20. By the series of steps described above, a solid electrolyte cell according to the second embodiment of the present technology can be formed.

(Effects)

The second embodiment has substantially the same effect as that of the first embodiment.

EXAMPLES

The present technology will now be described by way of examples thereof. It should be noted that the present technology is not restricted to the examples below.

Reference Example 1, Examples 1 to 6, Comparative Examples 1 to 10

Reference Example 1

Reference Example 1 will illustrate a solid electrolyte cell using $Li_xCu_yPO_4$ as the positive electrode active material film. A solid electrolyte cell having the configuration as illustrated in FIG. 1 was produced. A polycarbonate (PC) substrate having a thickness of 1.1 mm was used as the substrate 10. A film of SCZ ($SiO_2$—$Cr_2O_3$—$ZrO_2$) was formed as the inorganic insulating film 20 on the substrate 10.

A metallic mask was disposed on the inorganic insulating film 20, the positive electrode side current collector film 30 was made in a predetermined region, and then the positive electrode active material film 40, the solid electrolyte film 50, the negative electrode potential formation layer 64 and the negative electrode side current collector film 70 were formed in this order, to form a stacked body. A Ti film was formed as the positive electrode side current collector film 30, a $Li_xCu_yPO_4$ film as the positive electrode active material film 40, a $Li_3PO_{4-x}N_x$ film as the solid electrolyte film 50, a $LiCoO_2$ film as the negative electrode potential formation layer 64, and a Ti film was formed as the negative electrode side current collector film 70.

The film-forming conditions for the inorganic insulating film 20 and for each thin film which makes up the stacked body were set as follows. In addition, the substrate 10 was not subjected to heating of the substrate, and the film formation was performed with a substrate holder being cooled in water at 20° C.

(Inorganic Insulating Film 20)

The inorganic insulating film 20 was formed by the following sputtering apparatus under the following film-forming conditions.

Figure 3:
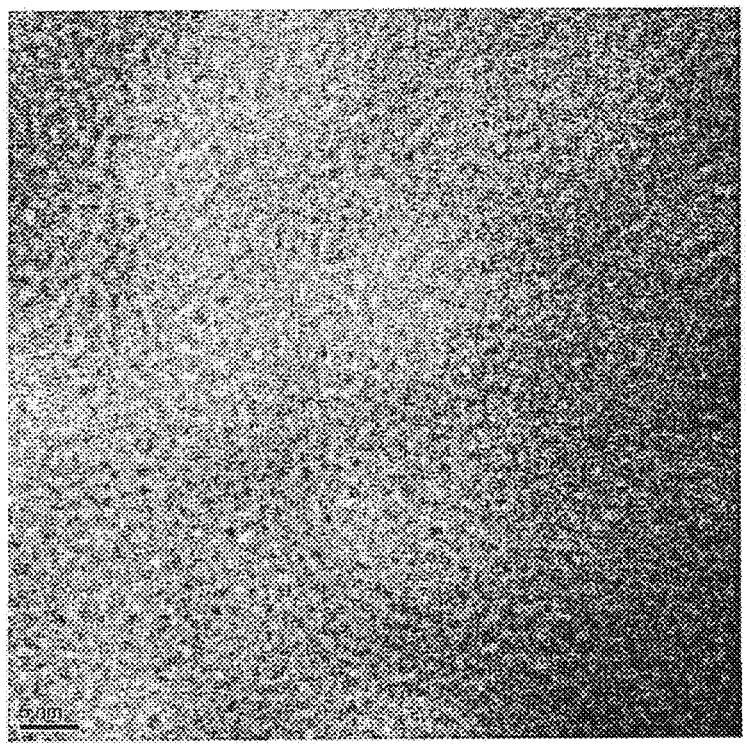
FIG. 3A shows a TEM image of a cross section of a positive electrode active material film of Reference Example 1.
FIG. 3B shows an electron diffraction pattern.
Figure 3:
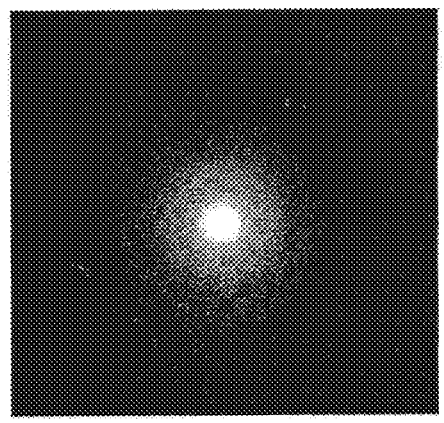
Figure 4:
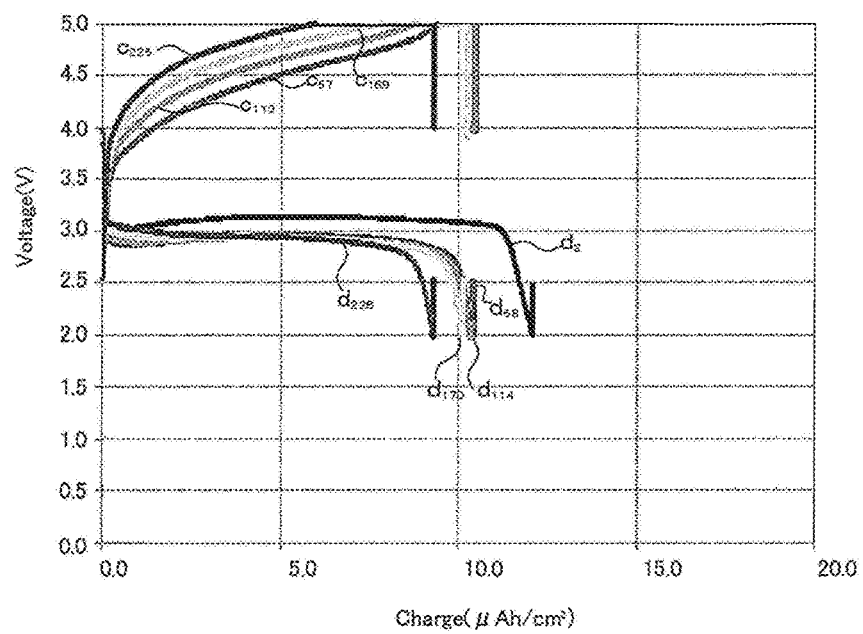
FIG. 4 is a graph showing charge-discharge curves of Reference Example 1.

Sputtering apparatus (C-3103 by ANELVA)
Target composition: SCZ (SiO$_2$ 35 at % (atomic percent)+ Cr$_2$O$_2$ 30 at %+ZrO$_2$ 35 at %)
Target size: Φ6 inches
Sputtering gas: Ar 100 sccm, 0.13 Pa
Sputtering power: 1000 W (RF)
(Positive Electrode Side Current Collector Film 30)
The positive electrode side current collector film 30 was formed by the following sputtering apparatus under the following film-forming conditions.
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 100 nm
(Positive Electrode Active Material Film 40)
The positive electrode active material film 40 was formed by the following sputtering apparatus under the following film-forming conditions.
Sputtering apparatus (SMO-01 special model by ULVAC, Inc.)
Target composition: co-sputtering of Li$_3$PO$_4$ and Cu
Target size: Φ4 inches
Sputtering gas: Ar (80%) +O$_2$ (20%) 20 sccm, 0.20 Pa
Sputtering power: Li$_3$PO$_4$ 600 W (RF), Cu 50 W (DC)
Film thickness: 350 nm
(Solid Electrolyte Film 50)
The solid electrolyte film 50 was formed by the following sputtering apparatus under the following film-forming conditions.
Sputtering apparatus (SMO-01 special model by ULVAC, Inc.)
Target composition: Li$_3$PO$_4$
Target size: Φ4 inches
Sputtering gas: Ar 20 sccm +N$_2$ 20 sccm, 0.26 Pa
Sputtering power: 600 W (RF)
Film thickness: 400 nm
(Negative Electrode Potential Formation Layer 64)
The negative electrode potential formation layer 64 was formed by the following sputtering apparatus under the following film-forming conditions. Sputtering apparatus (SMO-01 special model by ULVAC, Inc.)
Target composition: LiCoO$_2$
Target size: Φ4 inches
Sputtering gas: (Ar 80%+O$_2$ 20% mixture gas) 20 sccm, 0.20 Pa
Sputtering power: 300 W (RF)
Film thickness: 10 nm
(Negative Electrode Side Current Collector Film 70)
The negative electrode side current collector film 70 was formed by the following sputtering apparatus under the following film-forming conditions.
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 200 nm Finally, the overall protective film 80 was formed using a UV-curing resin (product code SK3200 by Sony Chemical & Information Device Corp.), and, further, an inorganic insulating film was formed on the UV-curing resin under the same film-forming conditions as the above. The solid electrolyte cell of Reference Example 1 was thus obtained. That is, the solid electrolyte cell of Reference Example 1 having the following film configuration was obtained.
(Film Configuration of Solid Electrolyte Cell)
Polycarbonate substrate/SCZ (50 nm)/Ti (100 nm)/Li$_x$Cu$_y$PO$_4$ (350 nm)/Li$_3$PO$_{4-x}$N$_x$ (400 nm)/LiCoO$_2$ (10 nm)/Ti (200 nm)/UV-curing resin (20 μm)/SCZ (50 nm)
[Analysis of Positive Electrode Active Material Film 40]
(XPS Analysis)
An analysis of the positive electrode active material film 40 was conducted in the following manner. A monolayer film similar to the positive electrode active material film 40 was formed on a quartz glass under the same film forming conditions as those for the positive electrode active material film 40. The chemical composition of the monolayer film was analyzed by X-ray photoelectron spectroscopy (XPS). As a result, the composition of the monolayer film was found to be Li$_{2.2}$Cu$_{2.2}$PO$_{4.0}$.
(TEM Analysis)
In addition, a section of the monolayer film was observed with a transmission electron microscope (TEM). The results are shown in FIG. 3. FIG. 3A shows a TEM image which was observed with a transmission electron microscope (TEM). FIG. 3B shows an electron diffraction pattern.
As shown in FIG. 3A, no crystal grain was observed in the TEM image. Besides, as shown in FIG. 3B, a halo ring indicative of an amorphous state was observed in the electron diffraction pattern. Thus, it was confirmed that the positive electrode active material film 40 was amorphous.
(Charge-Discharge Test)
The solid electrolyte cell of Reference Example 1 was subjected to a charge-discharge test. Charging was performed at a charge current of 50 μA and a charge cutoff voltage of 5V. Discharging was performed at a discharge current of 50 μA and a discharge cutoff voltage of 2V. Incidentally, 50 μA is equivalent to 5 C (a current value at which a theoretical capacity is charged or discharged in 0.2 hours). The measurement results are shown in FIG. 4. In FIG. 4, the line c$_x$ shows a charge curve. The subscript x is an odd number, showing that the line c$_x$ is a charge curve for the ((x+1)/2)-th charging. The line d$_y$ shows a discharge curve. The subscript y is an even number, showing that the line d$_y$ is a discharge curve for the (y/2)-th discharging after the initial charging.
As shown in FIG. 4, the solid electrolyte cell of Reference Example 1 was superior in flatness of discharge potential in the vicinity of 3V. Further, the positive electrode active material showed good characteristics against repetition of charging and discharging.

Example 1

A solid electrolyte cell having the configuration as illustrated in FIG. 1 was produced. A polycarbonate (PC) substrate having a thickness of 1.1 mm was used as the substrate 10. A film of SiN was formed as the inorganic insulating film 20 on the substrate 10. A metallic mask was disposed on the inorganic insulating film 20, and then in a predetermined region, the positive electrode side current collector film 30, the positive electrode active material film 40, the solid electrolyte film 50, the negative electrode potential formation layer 64 and the negative electrode side current collector film 70 were formed in this order, to form a stacked body. Specifically, a Ti film was formed as the positive electrode side current collector film 30, a Li$_x$Ni$_y$PO$_z$ film as the positive electrode active material film 40, a Li$_3$PO$_{4-x}$N$_x$ film as the solid electrolyte film 50, a LiCoO$_2$ film as the negative electrode potential formation layer 64, and a Ti film was formed as the negative electrode side current collector film 70.

The film-forming conditions for the inorganic insulating film 20 and for each thin film which makes up the stacked body were set as follows. In addition, the film formation was performed without heating of the substrate 10.
(Inorganic Insulating Film 20)

The inorganic insulating film 20 was formed by the following sputtering apparatus under the following film-forming conditions.
Sputtering apparatus (C-3103 by ANELVA)
Target composition: Si
Target size: Φ6 inches
Sputtering gas: Ar 60 sccm, $N_2$ 30 sccm, 0.11 Pa
Sputtering power: 1500 W (DC)
(Positive Electrode Side Current Collector Film 30)

The positive electrode side current collector film 30 was formed by the following sputtering apparatus under the following film-forming conditions.
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 100 nm
(Positive Electrode Active Material Film 40)

The positive electrode active material film was formed by the following sputtering apparatus under the following film-forming conditions.
Sputtering apparatus (SMO-01 special model by ULVAC, Inc.)
Target composition: co-sputtering of $Li_3PO_4$ and Ni
Target size: Φ4 inches
Sputtering gas: Ar (80%) +$O_2$ (20%) 20 sccm, 0.20 Pa
Sputtering power: $Li_3PO_4$ 600 W (RF), Ni 150 W (DC)
Film thickness: 340 nm
(Solid Electrolyte Film 50)

The solid electrolyte film 50 was formed by the following sputtering apparatus under the following film-forming conditions.
Sputtering apparatus (SMO-01 special model by ULVAC, Inc.)
Target composition: $Li_3PO_4$
Target size: Φ4 inches
Sputtering gas: Ar 20 sccm+$N_2$ 20 sccm, 0.26 Pa
Sputtering power: 600 W (RF)
Film thickness: 400 nm
(Negative Electrode Potential Formation Layer 64)

The negative electrode potential formation layer 64 was formed by the following sputtering apparatus under the following film-forming conditions.
Sputtering apparatus (SMO-01 special model by ULVAC, Inc.)
Target composition: $LiCoO_2$
Target size: Φ4 inches
Sputtering gas: (Ar 80%+$O_2$ 20% mixture gas) 20 sccm, 0.20 Pa
Sputtering power: 300 W (RF)
Film thickness: 10 nm
(Negative Electrode Side Current Collector Film 70)

The negative electrode side current collector film 70 was formed by the following sputtering apparatus under the following film-forming conditions.
Sputtering apparatus (SMO-01 special model by ULVAC, Inc.)
Target composition: Ni
Target size: Φ4 inches
Sputtering gas: Ar 70 sccm, 0.45 Pa
Sputtering power: 1000 W (DC)
Film thickness: 200 nm Finally, the overall protective film 80 was formed using a UV-curing resin (product code SK3200 by Sony Chemical & Information Device Corp.), and, further, an inorganic insulating film was formed on the overall protective film 80. The solid electrolyte cell of Example 1 was thus obtained. That is, the solid electrolyte cell of Example 1 having the following film configuration was obtained.
(Film Configuration of Solid Electrolyte Cell)

Polycarbonate substrate/SiN (50 nm)/Ti (100 nm)/$Li_xNi_y$-$PO_z$ (340 nm)/$Li_3PO_{4-x}N_x$ (400 nm)/$LiCoO_2$ (10 nm)/Ni (200 nm)/UV-curing resin (20 μm)/SiN (50 nm)
[Analysis of Positive Electrode Active Material Film 40]
(XPS Analysis)

An analysis of the positive electrode active material film 40 was conducted in the following manner. A monolayer film similar to the positive electrode active material film 40 was formed on a quartz glass under the same film-forming conditions as those for the positive electrode active material film 40. The chemical composition of the monolayer film was analyzed by X-ray photoelectron spectroscopy (XPS). As a result, the composition of the monolayer film was found to be $Li_{2.2}Ni_{4.3}PO_7$.
(XRD Analysis)

From XRD analysis, no distinct peaks were found, and it was shown that the crystallinity was not high. By that the production method was almost the same as in Reference Example 1, it can be seen that this material was amorphous.
(TEM Analysis)

In addition, this monolayer film was observed with a transmission electron microscope (TEM). As a result, in the same manner as in Reference Example 1, no crystal grain was observed in the TEM image, and a halo ring indicative of an amorphous state was observed in the electron diffraction pattern. Thus, it was confirmed that the positive electrode active material film 40 was amorphous.
(Charge-Discharge Test)

Figure 5:
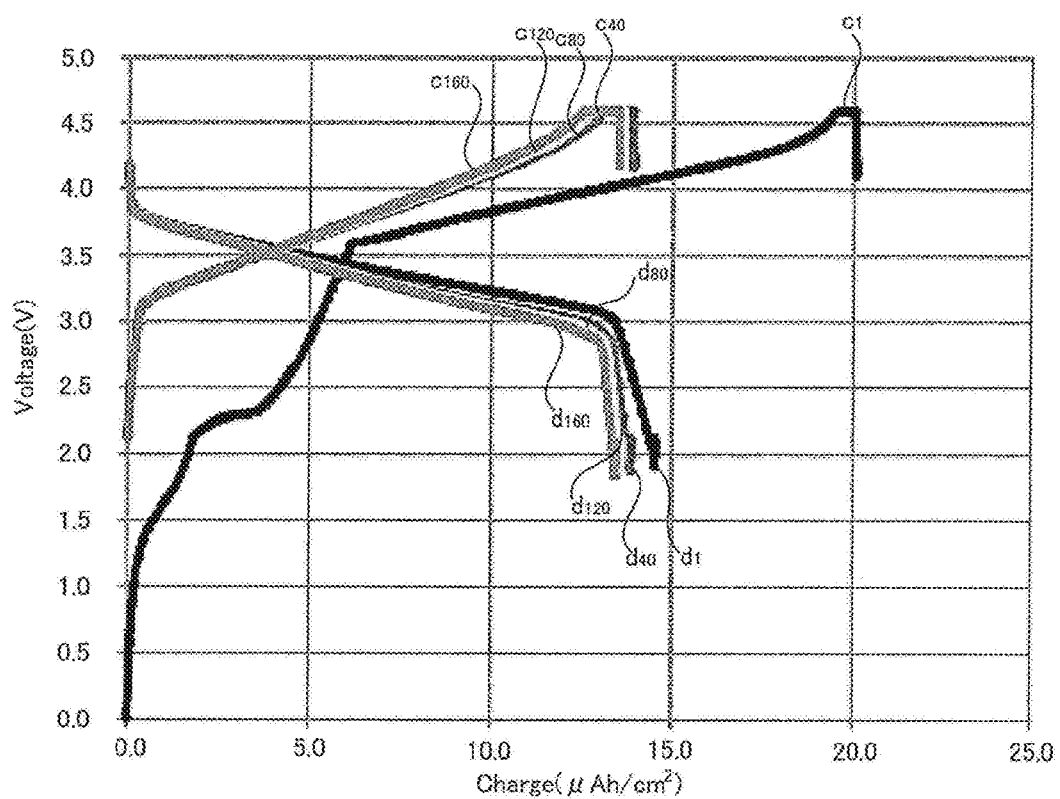
FIG. 5 is a graph showing charge-discharge curves of Example 1.

The solid electrolyte cell of Example 1 was subjected to a charge-discharge test. Charging was performed at a charge current of 50 μA and a charge cutoff voltage of 4.6V. Discharging was performed at a discharge current of 50 μA and a discharge cutoff voltage of 2V. Incidentally, 50 μA is equivalent to 6 C (a current value at which a theoretical capacity is charged or discharged in 0.1 hours). The measurement results are shown in FIG. 5. In FIG. 5, the line $c_n$ shows a charge curve. The subscript n shows that the line $c_n$ is a charge curve for the n-th charging. The line $d_k$ shows a discharge curve. The subscript k shows that the line $d_k$ is a discharge curve for the k-th discharging after the initial charging. (The same applies also to FIGS. 6 and 7 as follows).

As shown in FIG. 4, the solid electrolyte cell of Reference Example 1 was superior in linearity of the potential change when the potential was equal to or higher than 3V, and the positive electrode active material showed good characteristics against repetition of charging and discharging.

Example 2

A solid electrolyte cell was produced in the same manner as in Reference Example 1 except that the positive electrode active material film 40 was formed under the following film-forming conditions.
(Positive Electrode Active Material Film 40)

The positive electrode active material film 40 was formed by the following sputtering apparatus under the following film-forming conditions.

Sputtering apparatus (SMO-01 special model by ULVAC, Inc.)
Target composition: co-sputtering of $Li_3PO_4$ and Mn
Target size: Φ4 inches
Sputtering gas: Ar (80%) +$O_2$ (20%) 20 sccm, 0.20 Pa
Sputtering power: $Li_3PO_4$ 600 W (RF), Mn 200 W (DC)
Film thickness: 320 nm The composition of Mn in $Li_xMn_yPO_z$ is about the same as the composition of Cu in $Li_{2.2}Cu_{2.2}PO_4$ in Reference Example 1. The sputtering rates of the positive electrode active materials of Reference Example 1 and Example 1 are substantially the same.
(Charge-Discharge Test)

The solid electrolyte cell of Example 2 was subjected to a charge-discharge test in the same manner as in Example 1. The measurement results are shown in FIG. 6.

Figure 6:
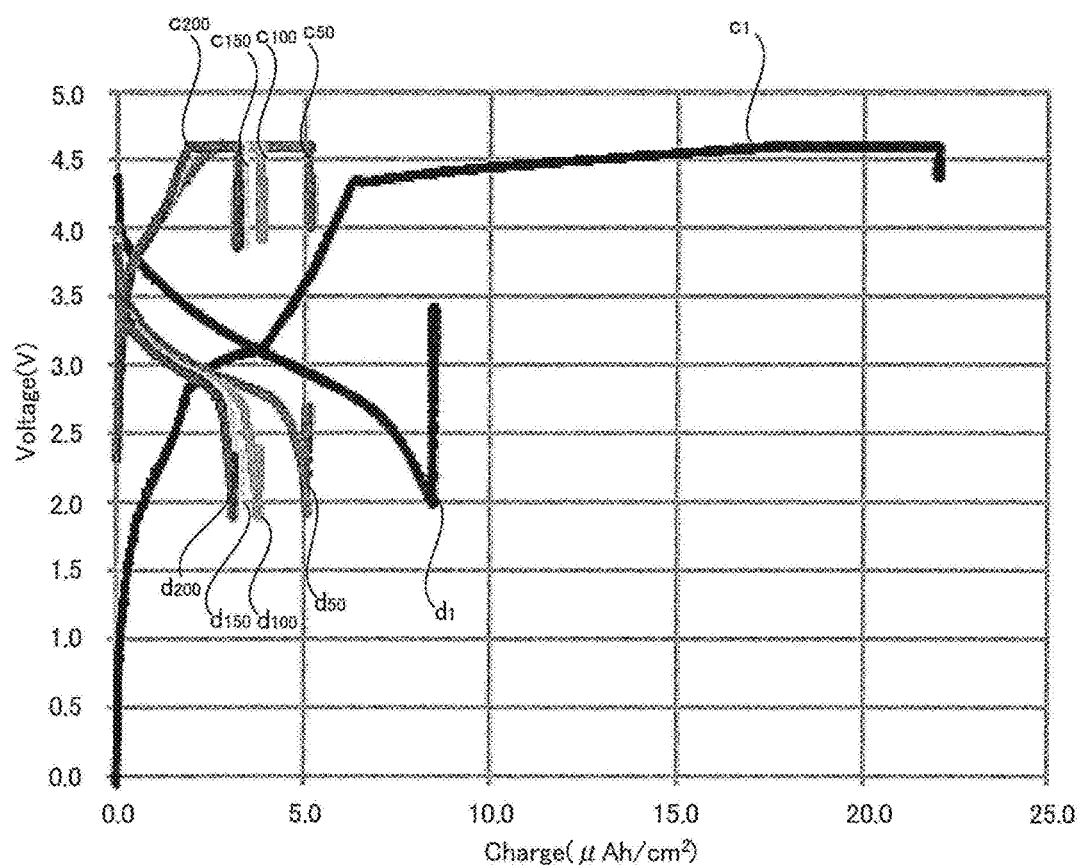
FIG. 6 is a graph showing charge-discharge curves of Example 2.

The charge-discharge potential was obtained as shown in FIG. 6, indicating that $Li_xMn_yPO_z$ functions as a positive electrode active material. By repetition of charging and discharging, a decrease in the potential was observed, and thus, it might not have a high durability against repetition of charging and discharging but is suitable for use in charging and discharging several times.

Example 3

A solid electrolyte cell was produced in the same manner as in Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (SMO-01 special model by ULVAC, Inc.)
Target composition: co-sputtering of $Li_3PO_4$ and Ag
Target size: Φ4 inches
Sputtering gas: Ar (80%) +$O_2$ (20%) 20 sccm, 0.20 Pa
Sputtering power: $Li_3PO_4$ 600 W (RF), Ag 35 W (DC)
Film thickness: 320 nm The composition of Ag in $Li_xAg_yPO_z$ is about the same as the composition of Cu in $Li_{2.2}Cu_{2.2}PO_4$ in Reference Example 1. The sputtering rates of the positive electrode active materials of Reference Example 1 and Example 2 are substantially the same.
(Charge-Discharge Test)

The solid electrolyte cell of Example 3 was subjected to a charge-discharge test in the same manner as in Example 1. The measurement results are shown in FIG. 7.

Figure 7:
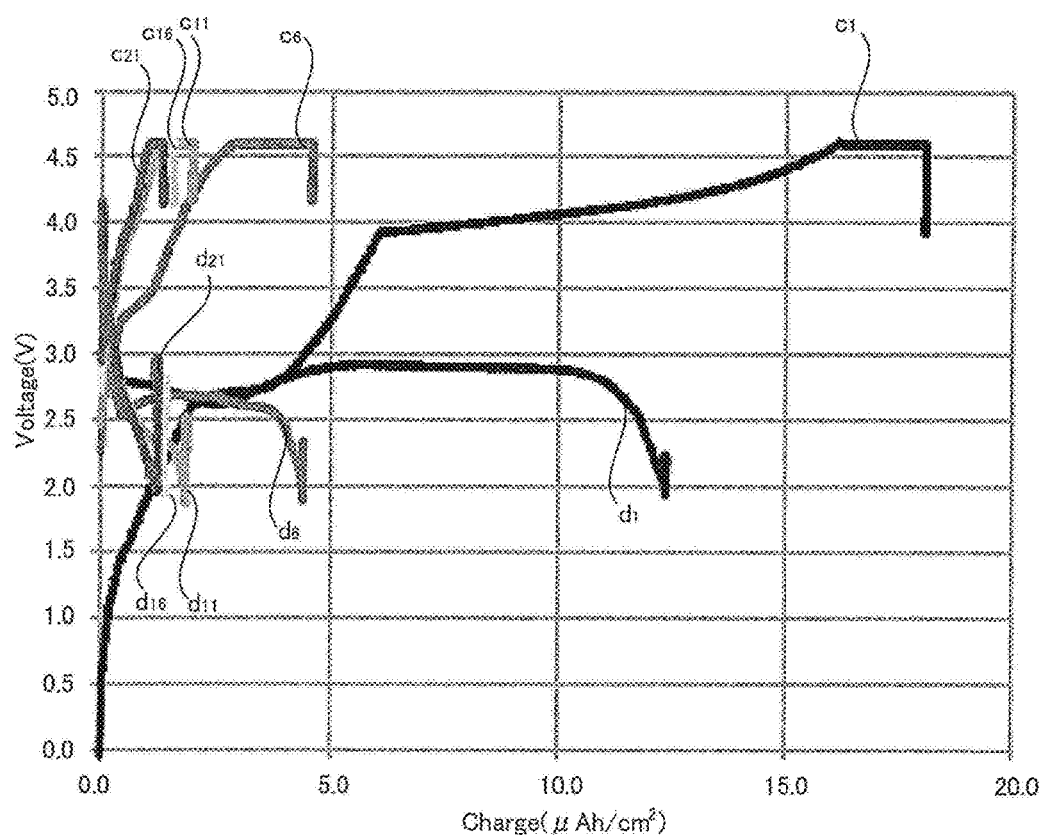
FIG. 7 is a graph showing charge-discharge curves of Example 3.

As shown in FIG. 7, a high capacity was obtained in the initial discharging. Further, it was capable of being charged and discharged, and in the discharge potential, a plateau of the potential close to 3V was obtained. The solid electrolyte cell of Example 3 might not have a high durability against repetition of charging and discharging, but it is suitable for use in charging and discharging several times.

Example 4

A solid electrolyte cell was produced in the same manner as in Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (C-3103 by ANELVA)
Target composition: co-sputtering of $Li_3PO_4$ and $LiCoO_2$
Target size: Φ6 inches
Sputtering gas: Ar (80%) +$O_2$ (20%) 20 sccm, 0.10 Pa
Sputtering power: $Li_3PO_4$ 1000 W (RF), $LiCoO_2$ 1000 W (RF)
Film thickness: 250 nm The composition of Co in $Li_xCo_yPO_z$ is about the same as for Cu in $Li_{2.2}Cu_{2.2}PO_4$ in Reference Example 1.
(Charge-Discharge Test)

The solid electrolyte cell of Example 4 was subjected to a charge-discharge test. Charging was performed at a charge current of 50 μA and a charge cutoff voltage of 5.0V. Discharging was performed at a discharge current of 50 μA and a discharge cutoff voltage of 2V. Incidentally, 50 μA is equivalent to 6 C (a current value at which a theoretical capacity is charged or discharged in 0.1 hours). The measurement results are shown in FIG. 8.

Figure 8:
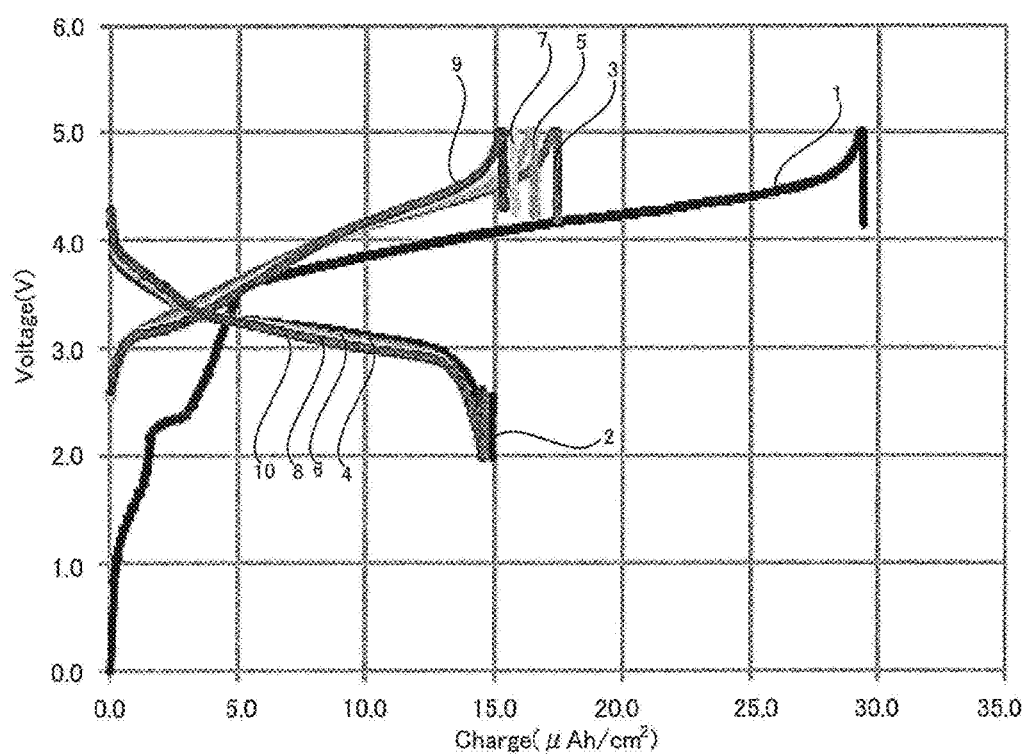
FIG. 8 is a graph showing charge-discharge curves of Example 4.

As shown in FIG. 8, a high discharge potential which was equal to or higher than 3V was obtained, and good charge-discharge characteristics, which showed almost no degradation until undergoing 10 times repetition of charging and discharging, were obtained.

Example 5

A solid electrolyte cell was produced in the same manner as in Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (C-3103 by ANELVA)
Target composition: co-sputtering of $Li_3PO_4$ and Au
Target size: Φ6 inches
Sputtering gas: Ar (80%) +$O_2$ (20%) 20 sccm, 0.10 Pa
Sputtering power: $Li_3PO_4$ 1000 W (RF), Au 170 W (DC)
Film thickness: 250 nm The sputtering power for Au was adjusted in such a manner that the composition of Au in $Li_xAu_yPO_z$ would be about the same as for Cu in $Li_{2.2}Cu_{2.2}PO_4$ in Reference Example 1.
(Charge-Discharge Test)

The solid electrolyte cell of Example 5 was subjected to a charge-discharge test in the same manner as in Example 4. The measurement results are shown in FIG. 9.

Figure 9:
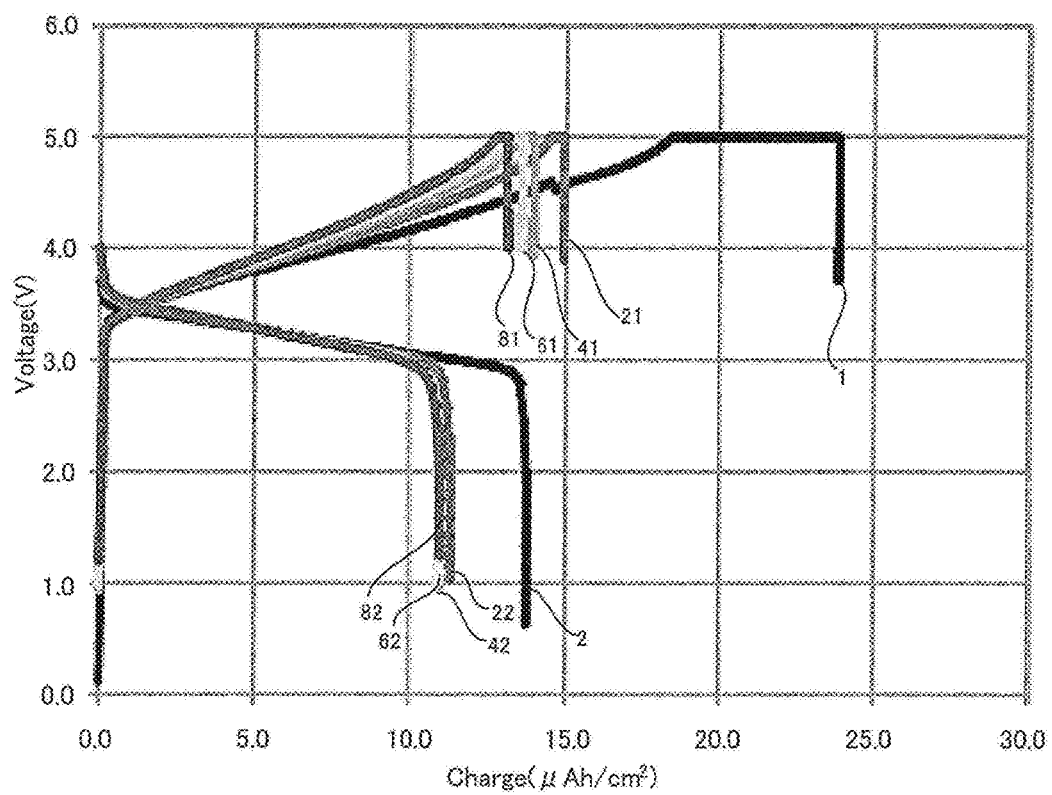
FIG. 9 is a graph showing charge-discharge curves of Example 5.

As shown in FIG. 9, a high discharge potential which was equal to or higher than 3V was obtained, and a good result, which showed less capacity degradation until undergoing 80 times repetition of discharging, was obtained.

Example 6

A solid electrolyte cell was produced in the same manner as in Reference Example 1 except that the positive electrode active material film 40 was formed under the following film-forming conditions.
(Positive Electrode Active Material Film)

The positive electrode active material film was formed by the following sputtering apparatus under the following film-forming conditions.

Sputtering apparatus (C-3103 by ANELVA)
Target composition: co-sputtering of $Li_3PO_4$ and Pd
Target size: Φ6 inches
Sputtering gas: Ar (80%) +$O_2$ (20%) 20 sccm, 0.10 Pa
Sputtering power: $Li_3PO_4$ 1000 W (RF), Pd 65 W (DC)
Film thickness: 238 nm The sputtering power for Pd was adjusted in such a manner that the composition of Pd in $Li_xPd_yPO_z$ would be about the same as for Cu in $Li_{2.2}Cu_{2.2}PO_4$ in Reference Example 1.
(Charge-Discharge Test)

The solid electrolyte cell of Example 6 was subjected to a charge-discharge test in the same manner as in Example 4. The measurement results are shown in FIG. 10.

Figure 10:
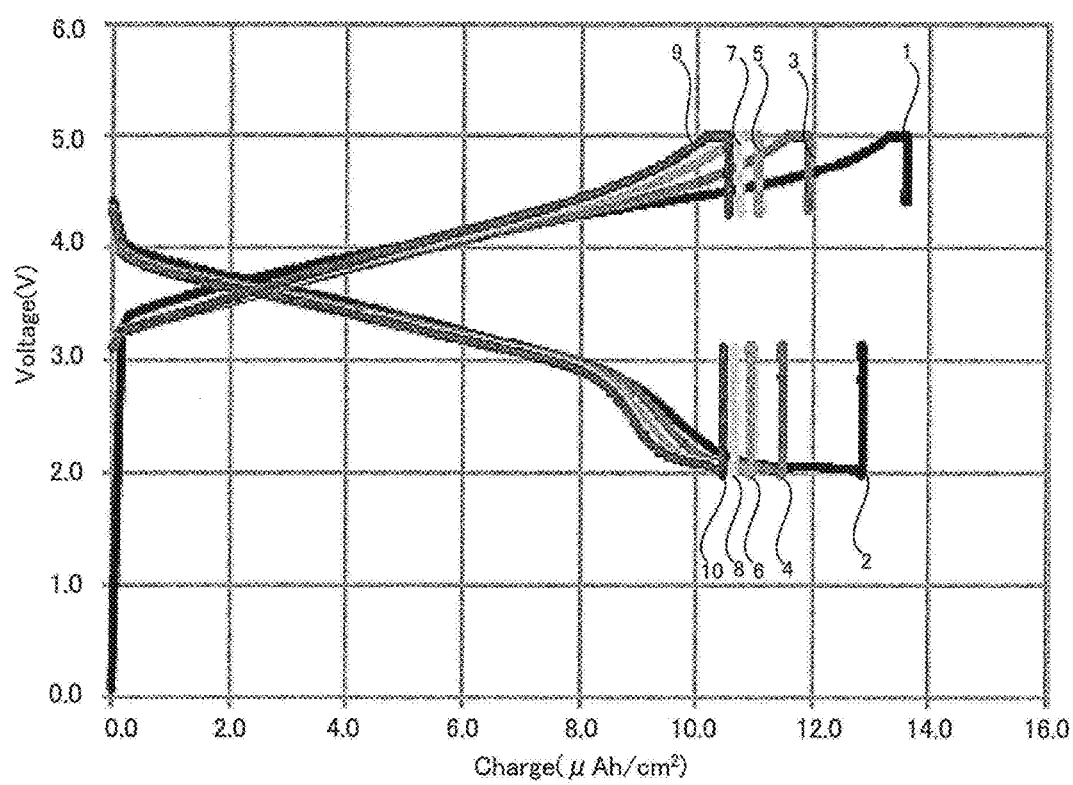
FIG. 10 is a graph showing charge-discharge curves of Example 6.

As shown in FIG. 10, although the discharge potential was seen to be divided into 3V or higher part and 2V or higher part, the capacity was high enough and thus a practicable cell could be obtained. Further, it has a high durability against repetition of charging and discharging.
(Capacity of Positive Electrode Active Material in Reference Example 1 and Examples 1 to 6)

In addition, for ease of comparing the capacities of the positive electrode active materials, an initial capacity of the positive electrode active material, which is calculated on the basis of the discharging capacity upon the first charging and discharging and the film density of the positive electrode active material film, is shown in Table 1 for Reference Example 1 and Examples 1 to 6. In Table 1, LiMPO is an abbreviation for the lithium phosphate compound containing Li, P, an element M (Ni, Co, Mn, Au, Ag, Pd or Cu) and O.

TABLE 1

| | LiMPO | Initial capacity of the positive electrode active material (mAh/g) |
|---|---|---|
| Ref. Ex. 1 | LiCuPO | 129 |
| Ex. 1 | LiNiPO | 250 |
| Ex. 2 | LiMnPO | 80 |
| Ex. 3 | LiAgPO | 120 |
| Ex. 4 | LiCoPO | 190 |
| Ex. 5 | LiAuPO | 135 |
| Ex. 6 | LiPdPO | 166 |

Comparative Example 1

A solid electrolyte cell was produced in the same manner as in Reference Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (C-3103 by ANELVA)
Target composition: co-sputtering of $Li_3PO_4$ and MgO
Target size: Φ6 inches
Sputtering gas: Ar (80%) +$O_2$ (20%) 20 sccm, 0.10 Pa
Sputtering power: $Li_3PO_4$ 800 W (RF), MgO 1400 W (RF)
Film thickness: 180 nm Comparative Example 2

A solid electrolyte cell was produced in the same manner as in Reference Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (C-3103 by ANELVA)
Target composition: co-sputtering of $Li_3PO_4$ and V
Target size: Φ6 inches
Sputtering gas: Ar (80%) +$O_2$ (20%) 20 sccm, 0.10 Pa
Sputtering power: $Li_3PO_4$ 1000 W (RF), V 650 W (RF)
Film thickness: 1870 nm Comparative Example 3

A solid electrolyte cell was produced in the same manner as in Reference Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (C-3103 by ANELVA)
Target composition: co-sputtering of $Li_3PO_4$ and Cr
Target size: Φ6 inches
Sputtering gas: Ar (80%) +$O_2$ (20%) 20 sccm, 0.10 Pa
Sputtering power: $Li_3PO_4$ 1000 W (RF), Cr 350 W (RF)
Film thickness: 190 nm Comparative Example 4

A solid electrolyte cell was produced in the same manner as in Reference Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (C-3103 by ANELVA)
Target composition: co-sputtering of $Li_3PO_4$ and ZnO
Target size: Φ6 inches
Sputtering gas: Ar (80%) +$O_2$ (20%) 20 sccm, 0.10 Pa
Sputtering power: $Li_3PO_4$ 1000 W (RF), ZnO 780 W (RF)
Film thickness: 240 nm Comparative Example 5

A solid electrolyte cell was produced in the same manner as in Reference Example 1 except that the positive electrode active material film 40 was formed under the following film-forming conditions.
(Positive Electrode Active Material Film)

The positive electrode active material film was formed by the following sputtering apparatus under the following film-forming conditions.
Sputtering apparatus (C-3103 by ANELVA)
Target composition: co-sputtering of $Li_3PO_4$ and $Ga_2O_3$
Target size: Φ6 inches
Sputtering gas: Ar (80%) +$O_2$ (20%) 20 sccm, 0.10 Pa
Sputtering power: $Li_3PO_4$ 1000 W (RF), $Ga_2O_3$ 700 W (RF)
Film thickness: 220 nm Comparative Example 6

A solid electrolyte cell was produced in the same manner as in Reference Example 1 except that the positive electrode active material film 40 was formed under the following film-forming conditions.

(Positive Electrode Active Material Film)
The positive electrode active material film was formed by the following sputtering apparatus under the following film-forming conditions.
Sputtering apparatus (C-3103 by ANELVA)
Target composition: co-sputtering of $Li_3PO_4$ and $In_2O_3$
Target size: Φ6 inches
Sputtering gas: Ar (80%) +$O_2$ (20%) 20 sccm, 0.10 Pa
Sputtering power: $Li_3PO_4$ 1000 W (RF), $In_2O_3$ 470 W (RF)
Film thickness: 265 nm Comparative Example 7

A solid electrolyte cell was produced in the same manner as in Reference Example 1 except that the positive electrode active material film 40 was formed under the following film-forming conditions.
(Positive Electrode Active Material Film)
Sputtering apparatus (C-3103 by ANELVA)
Target composition: co-sputtering of $Li_3PO_4$ and $SnO_2$
Target size: Φ6 inches
Sputtering gas: Ar (80%) +$O_2$ (20%) 20 sccm, 0.10 Pa
Sputtering power: $Li_3PO_4$ 1000 W (RF), $SnO_2$ 200 W (RF)
Film thickness: 240 nm Comparative Example 8

A solid electrolyte cell was produced in the same manner as in Reference Example 1 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (C-3103 by ANELVA)
Target composition: co-sputtering of $Li_3PO_4$ and Sb
Target size: Φ6 inches
Sputtering gas: Ar (80%) +$O_2$ (20%) 20 sccm, 0.10 Pa
Sputtering power: $Li_3PO_4$ 1000 W (RF), Sb 70 W (RF)
Film thickness: 230 nm Comparative Example 9

A solid electrolyte cell was produced in the same manner as in Reference Example 1 except that the positive electrode active material film 40 was formed under the following film-forming conditions.
The positive electrode active material film was formed by the following sputtering apparatus under the following film-forming conditions.
(Positive Electrode Active Material Film)
Sputtering apparatus (C-3103 by ANELVA)
Target composition: co-sputtering of $Li_3PO_4$ and $HfO_2$
Target size: Φ6 inches
Sputtering gas: Ar (80%) +$O_2$ (20%) 20 sccm, 0.10 Pa
Sputtering power: $Li_3PO_4$ 1000 W (RF), $HfO_2$ 1000 W (RF)
Film thickness: 160 nm Comparative Example 10

A solid electrolyte cell was produced in the same manner as in Reference Example 1 except that the positive electrode active material film 40 was formed under the following film-forming conditions.

(Positive Electrode Active Material Film)
The positive electrode active material film was formed by the following sputtering apparatus under the following film-forming conditions.
Sputtering apparatus (C-3103 by ANELVA)
Target composition: co-sputtering of $Li_3PO_4$ and W
Target size: Φ6 inches
Sputtering gas: Ar (80%) +$O_2$ (20%) 20 sccm, 0.10 Pa
Sputtering power: $Li_3PO_4$ 1000 W (RF), W 150 W (RF)
Film thickness: 230 nm The solid electrolyte cells of Comparative Examples 1 to 10 were subjected to a charge-discharge test in the same manner as in Example 1, and as a result, every one of them was with extremely low capacity, which was only 1-10 mAh/g when converted to the positive electrode capacity. This capacity was almost the same as a result of a charge-discharge test which was conducted by sandwiching LiPON alone between the electrodes. Thus, the lithium phosphate compound containing Li, P, an element M (Mg, V, Cr, Zn, Ga, In, Sn, Sb, Hf or W) and O was found not to have a function as a positive electrode active material.

Test Example 1

Figure 11:
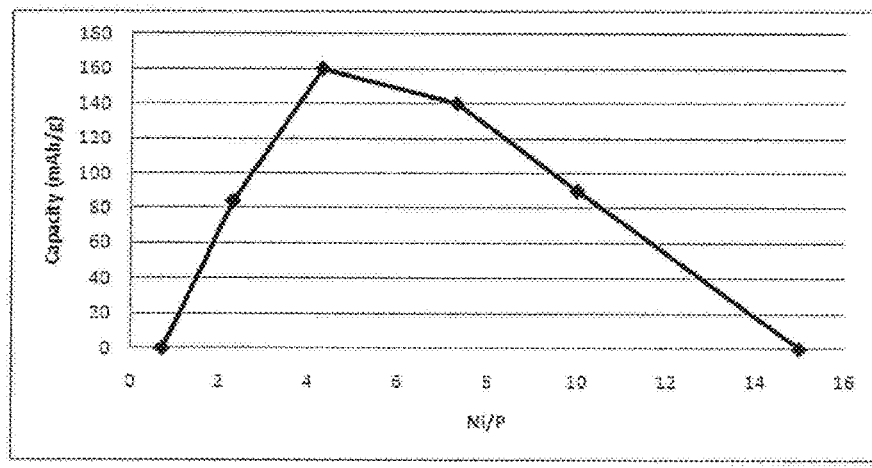
FIG. 11 is a graph plotting the composition ratio of nickel and the capacity in Test Example 1.
Figure 12:
FIG. 12 is a graph plotting the composition ratio of oxygen and the capacity in Test Example 1.
Figure 13:
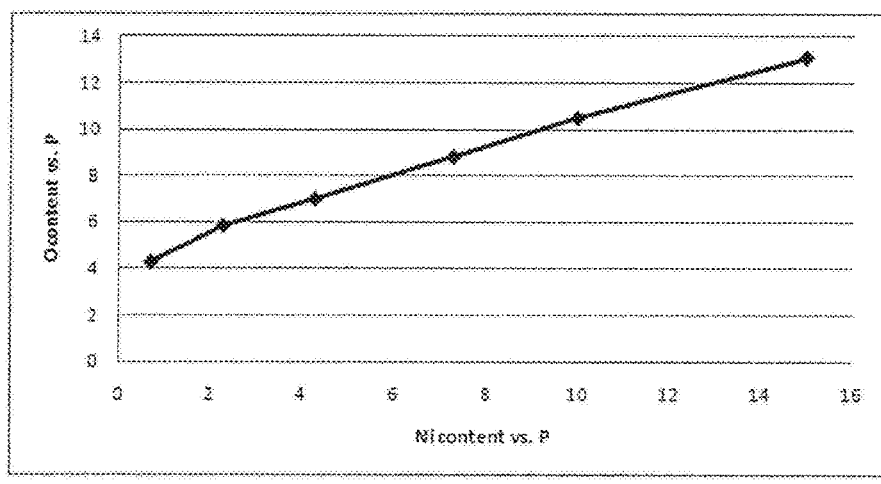
FIG. 13 is a graph plotting the composition ratios of nickel and oxygen.

A plurality of samples (solid electrolyte cells) in which the composition ratios y and z of $Li_xNi_yPO_z$ which makes up the positive electrode active material film were varied was produced, and the capacities of the samples were measured.
The film configurations of the samples were the same as one in Example 1. That is, polycarbonate substrate/SiN (50 nm)/Ti (100 nm)/$Li_xNi_yPO_z$ (340 nm)/$Li_3PO_{4-x}N_x$ (400 nm)/$LiCoO_2$ (10 nm)/Ni (200 nm)/UV-curing resin (20 μm)/SiN (50 nm).
Appropriately changing the sputtering power in the film-forming conditions of the positive electrode active material 40 for each sample, a plurality of samples differing in the composition ratio y of Ni and the composition ratio z of oxygen of $Li_xNi_yPO_z$ which makes up the positive electrode active material film 40 was produced. Each of the plurality of samples thus produced was charged and discharged under the same conditions as in Example 1, and the charge and discharge capacity at this time was determined for each sample. The measurement results are shown in FIG. 11.
As shown in FIG. 11, when the composition ratio y of $Li_xNi_yPO_z$ which makes up the positive electrode active material film 40 is less than 2 or more than 10, the energy density becomes the half of the peak. Thus, the composition ratio y of Ni of $Li_xNi_yPO_z$ was found to be desirable to be 2 or more and 10 or less. Further, FIG. 12 shows the composition ratio z of oxygen which was plotted for this case. FIG. 13 shows a graph, plotted in such a manner that the composition of Ni when assuming the composition of P as 1 is taken along the abscissa, and the composition of O when assuming the composition of P as 1 is taken along the ordinate. The following can be seen from the graph. When the composition of Ni increased, the composition of oxygen increased along with this increase. The composition of oxygen becomes the optimal amount corresponding to the compositions of Ni and P.

Test Example 2

A plurality of samples (solid electrolyte cells) in which the composition ratio y of copper of $Li_xCu_yPO_4$ which makes up the positive electrode active material film 40 was varied was produced, and the capacities of the samples were measured.
The film configurations of the samples were the same as one in Example 1. That is, the film configurations were polycarbonate substrate/SCZ (50 nm)/Ti (100 nm)/$Li_xCu_yPO_4$ (350 nm)/$Li_3PO_4N_x$ (400 nm)/$LiCoO_2$ (10 nm)/Ti (200 nm)/UV-curing resin (20 μm)/SCZ (50 nm).

Appropriately changing the sputtering power in the film-forming conditions of the positive electrode active material 40 for each sample, a plurality of samples differing in the composition ratio y of copper of $Li_xCu_yPO_4$ which makes up the positive electrode active material film 40 was produced. Each of the plurality of samples thus produced was charged and discharged under the same conditions as in Example 1, and the charge and discharge capacity at this time was determined for each sample. The measurement results are shown in FIG. 14.

Figure 14:
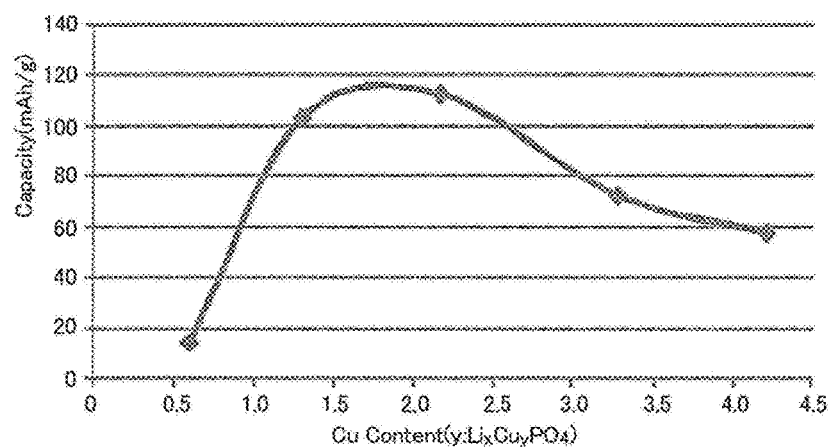
FIG. 14 is a graph showing measurement results of Test example 2.

As shown in FIG. 14, when the composition ratio y of copper of $Li_xCu_yPO_4$ which makes up the positive electrode active material film 40 decreases below 1.0, the capacity would decrease sharply. Thus, the composition ratio y of copper of $Li_xCu_yPO_4$ which makes up the positive electrode active material film 40 was confirmed to be desirable to be 1.0 or more. In addition, the capacity increased when the composition ratio y of copper was 1.0 or more and 2.2 or less, and the capacity per unit weight decreased when the composition ratio y of copper became more than around 2.2. This is because while an increase in the composition ratio y of copper in the positive electrode active material raised the weight density, it lowered the composition ratio x of lithium which can be contained in the positive electrode active material. Further, when the composition ratio y of copper exceeds 4.0, the capacity becomes equal to or less than a half of the capacity at the composition ratio y of copper around y=2.2, where the maximum capacity can be obtained. Thus, the composition ratio y of copper of $Li_xCu_yPO_4$ was found to be desirable to be $1.0 \leq y \leq 4.0$.

Test Example 3

The limit of the composition ratio x of lithium of $Li_xCu_yPO_4$ was studied as will be described in the following.
<Sample 1>

First, a solid electrolyte cell of Sample 1 was produced. This solid electrolyte cell has the following film configuration, in which, a Ti film as a positive electrode side current collector film, a $Li_{2.2}Cu_{2.8}PO_4$ film as a positive electrode active material film, a $Li_3PO_4$ film as a solid electrolyte film, a Cu film and a Ti film as negative electrode side current collector films are stacked, in this order, on a Si substrate with $SiO_2$ film. In addition, this solid electrolyte cell does not have a negative electrode active material at the time of production, but by charging, Li is deposited on an interface on the negative electrode side of the solid electrolyte layer and is utilized as the negative electrode active material.
(Film Configuration of Solid Electrolyte Cell)

Si substrate with $SiO_2$ film/Ti (100 nm)/$Li_{2.2}Cu_{2.8}PO_4$ (362 nm)/$Li_3PO_4$ (546 nm)/Cu (20 nm)/Ti (100 nm)

The solid electrolyte cell of Sample 1 was produced as follows. That is, a metallic mask was disposed on Si substrate with $SiO_2$ film, and then in a predetermined region, the Ti film as the positive electrode side current collector film, the $Li_{2.2}Cu_{2.8}PO_4$ film as the positive electrode active material film, the $Li_3PO_4$ film as the solid electrolyte film, the Cu film and the Ti film as the negative electrode side current collector films were formed in this order. The solid electrolyte cell of Sample 1 was thus obtained. It should be noted that there is no annealing process during the production of this solid electrolyte cell.

Figure 15:
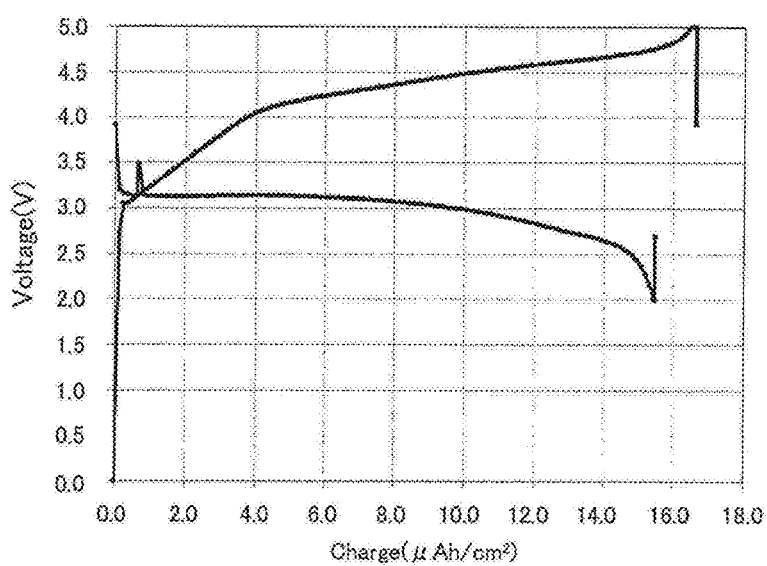
FIG. 15 is a graph showing charge-discharge curves for Sample 1.

(Positive Electrode Side Current Collector Film)
The positive electrode side current collector film was formed by the following sputtering apparatus under the following film-forming conditions.
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 100 nm
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$ and Cu
Target size: Φ4 inches
Sputtering gas: Ar (80%) +$O_2$ (20%) 20 sccm, 0.20 Pa
Sputtering power: $Li_3PO_4$ 600 W (RF), Cu 60 W (DC)
Film thickness: 362 nm
(Solid Electrolyte Film)
The solid electrolyte film was formed by the following sputtering apparatus under the following film-forming conditions.
Sputtering apparatus (SMO-01 special model by ULVAC, Inc.)
Target composition: $Li_3PO_4$
Target size: Φ4 inches
Sputtering gas: Ar (80%) +$O_2$ (20%) 20 sccm, 0.20 Pa
Sputtering power: 600 W (RF)
Film thickness: 546 nm
(Negative Electrode Side Current Collector Film) (Cu Film)
The Cu film was formed by the following sputtering apparatus under the following film-forming conditions. Sputtering apparatus (SMO-01 special model by ULVAC, Inc.)
Target composition: Cu
Target size: Φ4 inches
Sputtering gas: Ar 70 sccm, 0.45 Pa
Sputtering power: 1000 W (DC)
Film thickness: 20 nm
(Ti Film)
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 100 nm
(Charge-Discharge Test)
The solid electrolyte cell of Sample 1 was subjected to a charge-discharge test. Charging was performed at a charge current of 50 μA and a charge cutoff voltage of 5V. Discharging was performed at a discharge current of 50 μA and a discharge cutoff voltage of 2V. FIG. 15 shows the charge-discharge curves.

In this measurement result, the positive electrode capacity as calculated assuming that the film density of the positive electrode active material film was 3.26 g/cc was shown to be approximately 130 mAh/g.
<Sample 2>

Next, a solid electrolyte cell of Sample 2 was produced. This solid electrolyte cell is one that has the following film configuration, in which, a Ti film as a positive electrode side current collector film, a $Li_{2.2}Cu_{2.8}PO_4$ film as a positive electrode active material film, a Li₃PO₄ film as a solid electrolyte film and a Li film are stacked, in this order, on a Si substrate with SiO₂ film.

(Film Configuration of Solid Electrolyte Cell)

Si substrate with SiO₂ film/Ti (100 nm)/$Li_{2.2}Cu_{2.8}PO_4$ (362 nm)/$Li_3PO_4$ (546 nm)/Li (1500 nm)

The solid electrolyte cell of Sample 2 was produced as follows. That is, a metallic mask was disposed on Si substrate with SiO₂ film, and then in a predetermined region, the Ti film as the positive electrode side current collector film, the $Li_{2.2}Cu_{2.8}PO_4$ film as the positive electrode active material film, the $Li_3PO_4$ film as the solid electrolyte film and the Li film were formed in this order, under the following film-forming conditions. The solid electrolyte cell of Sample 2 was thus obtained. It should be noted that there is no annealing process during the production of this solid electrolyte cell.

(Film-Forming Conditions)

The film-forming conditions for the Ti film, the $Li_{2.2}Cu_{2.8}PO_4$ film and the $Li_3PO_4$ film were the same as for Sample 1. The Li film was formed under the following film-forming conditions.

(Li Film)

Bell-jar type resistance heating evaporation apparatus
Deposition source: Li
Deposition rate: 5.08 nm/sec, ultimate vacuum: 0.004 Pa
Film thickness: 1500 nm The produced solid electrolyte cell of Sample 2 was subjected to the following charging and discharging, for actively inserting Li, into the $Li_{2.2}Cu_{2.8}PO_4$ film at the time of production.

(First Charging and Discharging)

Figure 16:
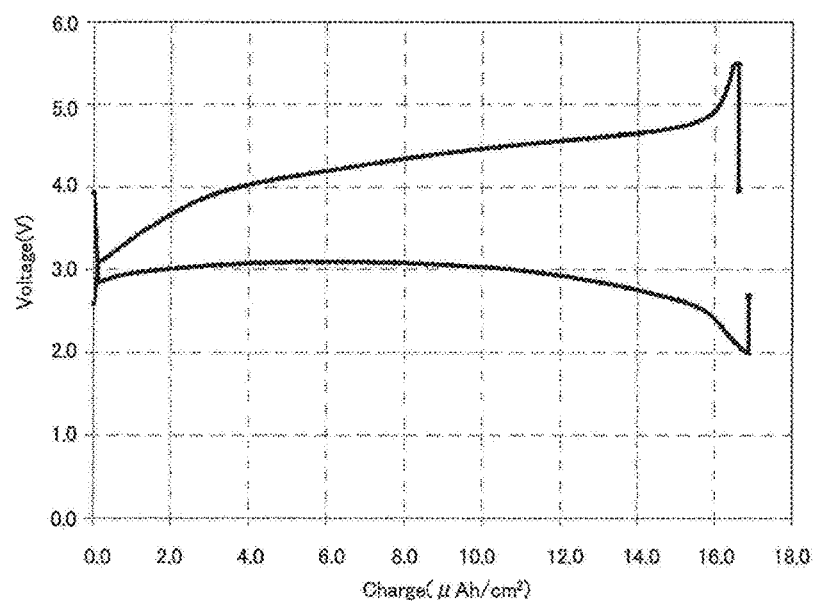
FIG. 16 is a graph showing charge-discharge curves for Sample 2.

First, the first charging and discharging was carried out. Charging was performed at a charge current of 50 μA and a charge cutoff voltage of 5.5V. Discharging was performed at a discharge current of 50 μA and a discharge cutoff voltage of 2V. The charge-discharge curves at this time are shown in FIG. 16.

In this charging and discharging, the positive electrode capacity as calculated assuming that the film density of the positive electrode active material film was 3.26 g/cc was shown to be approximately 140 mAh/g. That is, it was shown that the positive electrode capacity in the first discharging was almost the same as that in the case where the Li film was not formed (Sample 1), and thus, it was confirmed that Li in the Li film had not moved to the positive electrode side, after the first discharging.

(Discharging for Active Insertion of Li)

Figure 17:
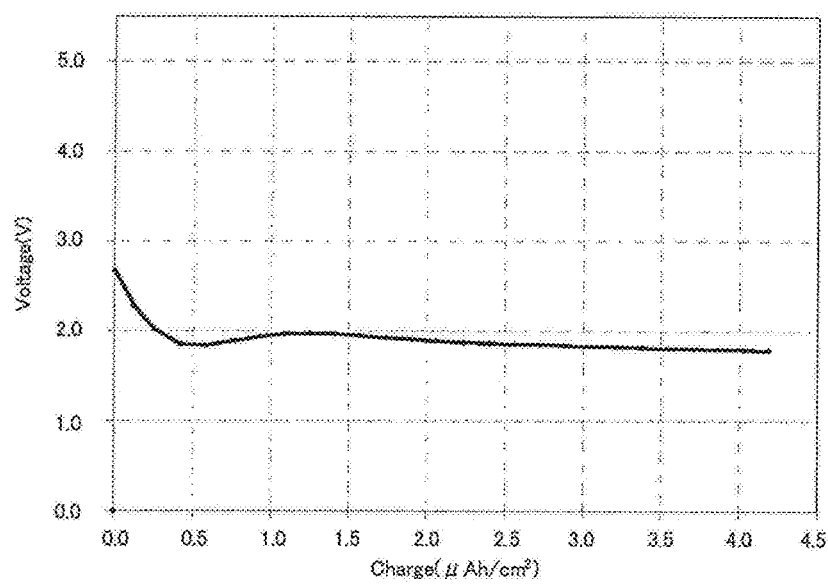
FIG. 17 is a graph showing a discharge curve for Sample 2.

Next, discharging was performed, and thus Li of the Li film equivalent to approximately 4 μAh/cm² was actively inserted into the $Li_{2.2}Cu_{2.8}PO_4$ film. The discharge curve at this time is shown in FIG. 17.

(Second Charging and Discharging)

Next, the second charging and discharging was carried out. Charging was performed at a charge current of 50 μA and a charge cutoff voltage of 5.5V. Discharging was performed at a discharge current of 50 μA and a discharge cutoff voltage of 1.8V. The charge-discharge curves at this time are shown in FIG. 18.

Figure 18:
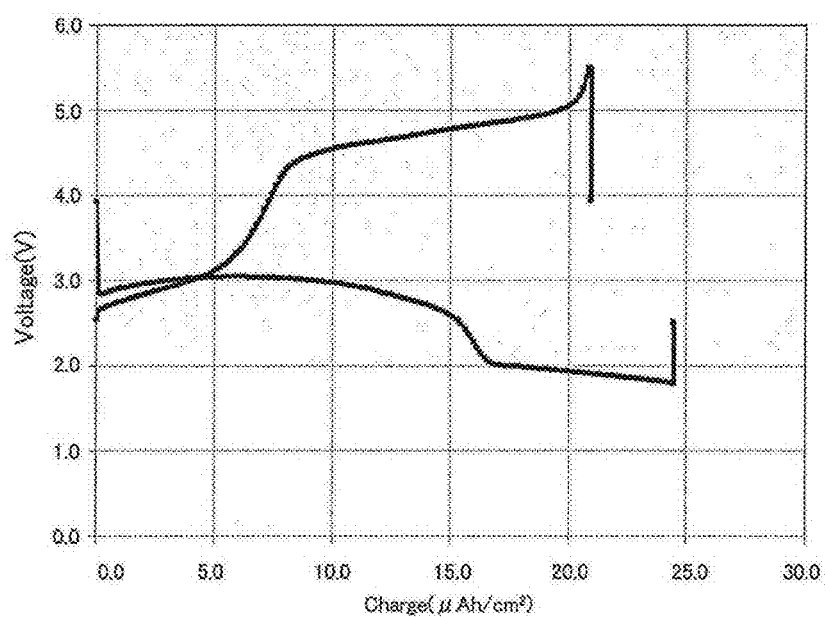
FIG. 18 is a graph showing charge-discharge curves for Sample 2.

As shown in FIG. 18, the charging capacity in the second charging was 20.8 μAh/cm². This charging capacity is equivalent to the total of the discharging capacity in the first discharging (16.8 μAh/cm²) and the discharging capacity in the discharging for actively inserting Li (4 μAh/cm²). That is, it can be confirmed that Li was taken out of the $Li_xCu_{2.8}PO_4$ film, by the second charging, and that the total Li of "the amount of Li in the $Li_{2.2}Cu_{2.8}PO_4$ film (hereinafter referred to as "the amount of Li at the time of production")" and "the amount of Li inserted by the discharging for actively inserting Li" had moved to the negative electrode side.

In addition, the discharging capacity in the second discharging was shown to be 24.3 μAh/cm². This discharging capacity is equivalent to the "charging capacity in the second charging (20.8 μAh/cm²)+3.5 μAh/cm²". That is, it can be confirmed that the total Li of "the amount of Li at the time of production", "the amount of Li inserted by the discharging for actively inserting Li" and "the amount of Li equivalent to 3.5 μAh/cm² (the amount of Li further inserted by the second discharging)" had moved to the positive electrode side, from the negative electrode side, by the second discharging.

(Third Charging and Discharging)

Figure 19:
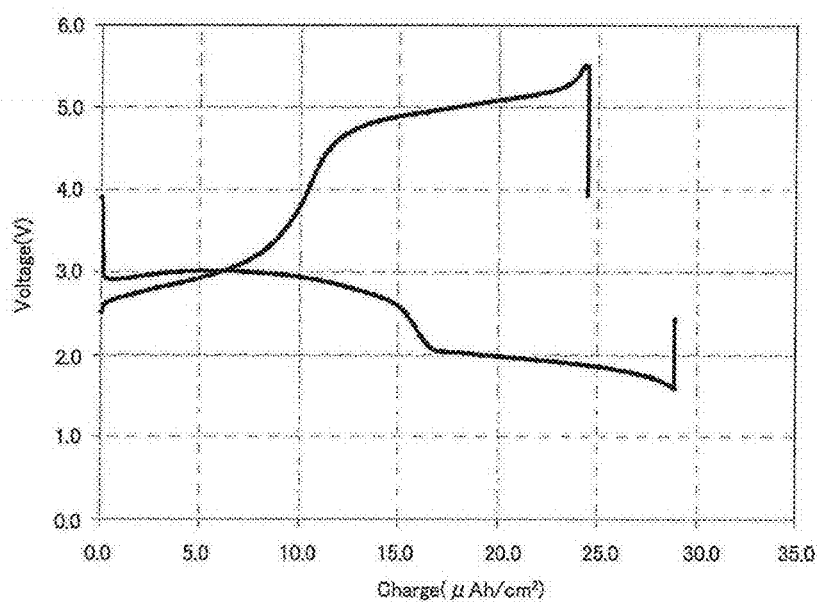
FIG. 19 is a graph showing charge-discharge curves for Sample 2.

Next, the third charging and discharging was carried out. Charging was performed at a charge current of 50 μA and a charge cutoff voltage of 5.5V. Discharging was performed at a discharge current of 50 μA and a discharge cutoff voltage of 1.6V. FIG. 19 shows the charge-discharge curves.

As shown in FIG. 19, the charging capacity in the third charging was 24.5 μAh/cm². This charging capacity is substantially equivalent to the discharging capacity in the second discharging (24.3 μAh/cm²). That is, it can be confirmed that Li was taken out of the $Li_xCu_{2.8}PO_4$ film, by the third charging, and that the total Li of "the amount of Li at the time of production", "the amount of Li inserted by the discharging for actively inserting Li" and "the amount of Li further inserted by the second discharging" had moved to the negative electrode side.

In addition, the discharging capacity in the third discharging was shown to be 28.9 μAh/cm². This discharging capacity is equivalent to the "charging capacity in the third charging (24.5 μAh/cm²)+4.4 μAh/cm²". That is, it can be confirmed that the total Li of "the amount of Li at the time of production", "the amount of Li inserted by the discharging for actively inserting Li", "the amount of Li further inserted by the second discharging" and "the amount of Li equivalent to 4.4 μAh/cm² (the amount of Li further inserted by the third discharging)" had moved to the positive electrode side, from the negative electrode side, by the third discharging.

(Fourth Charging and Discharging)

Then, after charging under conditions where a charge current was 50 μA and a charge cutoff voltage was 5.5V, discharging was performed at a discharge current of 50 μA until the discharging capacity reached 50.0 μAh/cm². The charge-discharge curves at this time are shown in FIG. 20.

Figure 20:
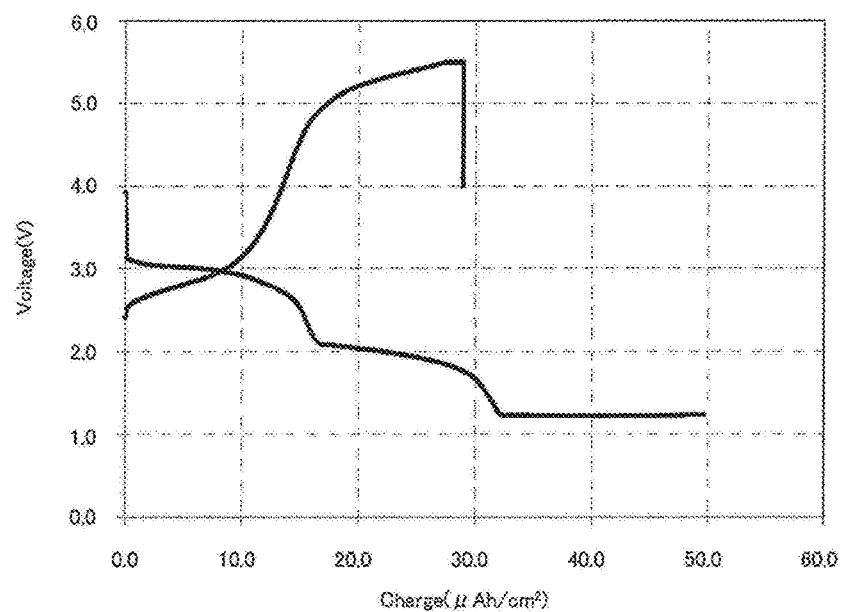
FIG. 20 is a graph showing charge-discharge curves for Sample 2.

As shown in FIG. 20, the charging capacity in the fourth charging was 28.9 μAh/cm². This charging capacity is equivalent to the discharging capacity in the third discharging. That is, it can be confirmed that Li was taken out of the $Li_xCu_{2.8}PO_4$ film, by the fourth charging, and that the amount of Li that had moved to the positive electrode side by the third discharging had moved to the negative electrode side.

In addition, the discharging capacity of 50.0 μAh/cm² in the fourth discharging is equivalent to the "charging capacity in the fourth charging (28.9 μAh/cm²)+21.1 μAh/cm²". That is, it can be confirmed that the total Li of "the amount of Li at the time of production", "the amount of Li inserted by the discharging for actively inserting Li", "the amount of Li further inserted by the third discharging" and "the amount of Li equivalent to 21.1 μAh/cm² (the amount of Li further inserted by the fourth discharging)" had moved to the positive electrode side, from the negative electrode side, by the fourth discharging.

(Fifth Charging and Discharging)

Figure 21:
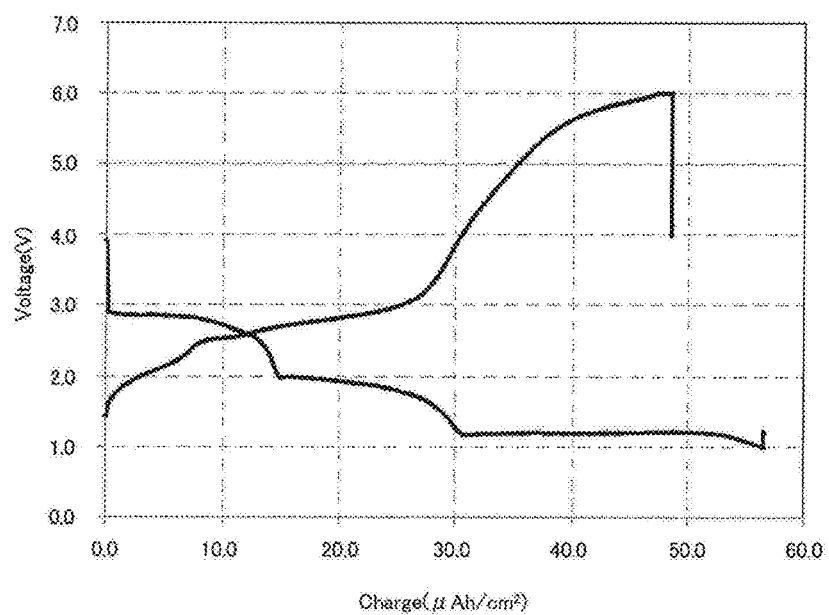
FIG. 21 is a graph showing charge-discharge curves for Sample 2.

Finally, charging was performed under conditions where a charge current was 50 μA and a charge cutoff voltage was 6.0V, and discharging was performed under conditions where a discharge current was 50 µA and a discharge cutoff voltage was 1.0V. FIG. 21 shows the charge-discharge curves.

Figure 22:
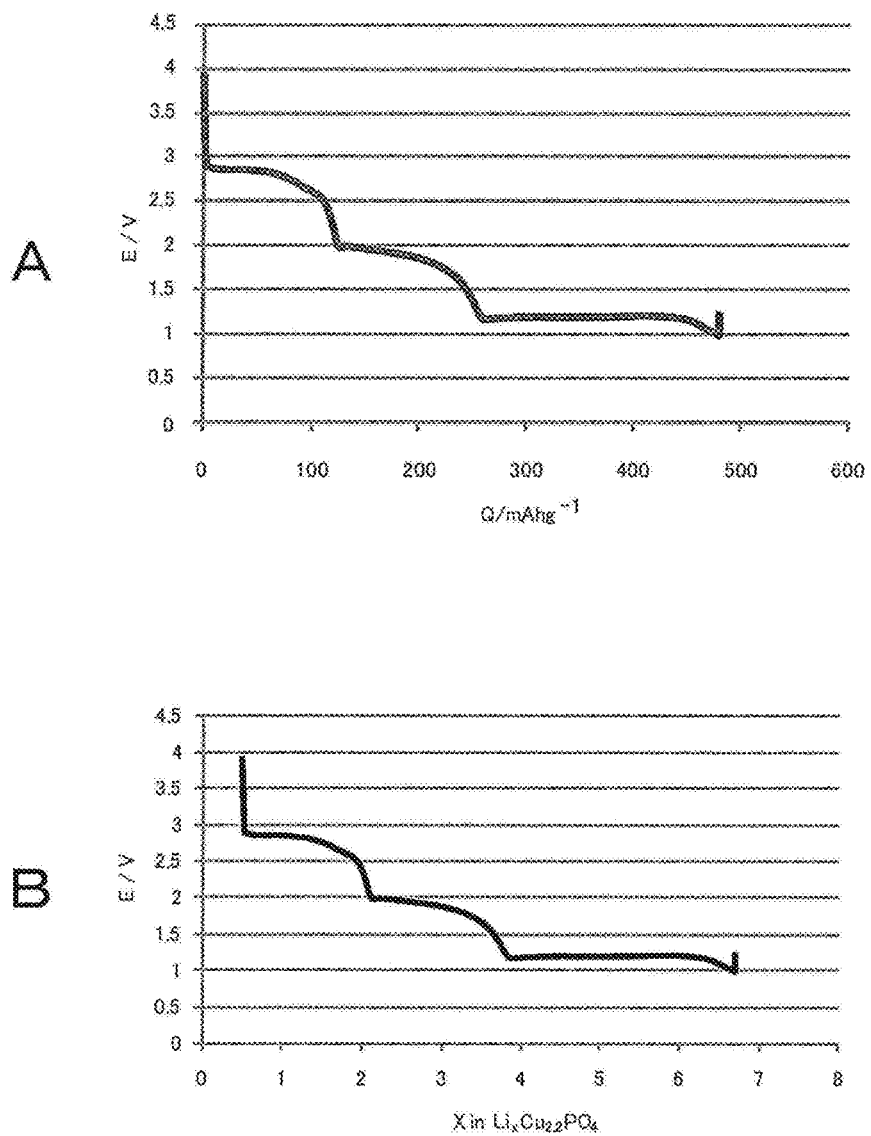
FIG. 22A is a graph showing a discharge curve for Sample 2 where the specific capacity (mAh/g) is taken along the abscissa.
FIG. 22B is a graph showing a discharge curve for Sample 2, where the composition ratio x of lithium of $Li_xCu_{2.8}PO_4$ is taken along the abscissa.

Further, for the fifth discharging, FIGS. 22A and 22B show discharge curves in which the specific capacity (mAh/g) and the composition ratio x of lithium of $Li_xCu_{2.8}PO_4$ are taken along their respective abscissae. As shown in FIG. 22, this amorphous positive electrode active material ingredient of $Li_xCu_{2.8}PO_4$ could be shown to be a high-capacity positive electrode active material component in which Li can be inserted up to x=7 approximately. In addition, the discharge curves were able to be divided into regions of 2.9 to 2.0V, 1.8 to 1.3V, and of 1.2V.

Test Example 4

The limit of the composition ratio x of lithium of $Li_xNi_yPO_4$ was studied as will be described in the following.
<Sample 3>
First, a solid electrolyte cell of Sample 3 was produced. This solid electrolyte cell is one that has the following film configuration, in which, a Ti film as a positive electrode side current collector film, a $Li_{2.4}Ni_{6.9}PO_{6.4}$ film as a positive electrode active material film, a $Li_3PO_4$ film as a solid electrolyte film and a Li film are stacked, in this order, on a Si substrate with $SiO_2$ film.

Si substrate with $SiO_2$ film/Ti (100 nm)/78 $Li_{2.4}Ni_{6.9}PO_{6.4}$ (329 nm)/$Li_3PO_4$ (546 nm)/Li (1000 nm)

The solid electrolyte cell of Sample 3 was produced as follows. That is, a metallic mask was disposed on Si substrate with $SiO_2$ film, and then in a predetermined region, the Ti film as the positive electrode side current collector film, the $Li_{2.4}Ni_{6.9}PO_{6.4}$ film as the positive electrode active material film, the $Li_3PO_4$ film as the solid electrolyte film and the Li film were formed in this order. The solid electrolyte cell of Sample 3 was thus obtained. It should be noted that there is no annealing process during the production of this solid electrolyte cell.
(Positive Electrode Side Current Collector Film)
The positive electrode side current collector film was formed by the following sputtering apparatus under the following film-forming conditions.
Sputtering apparatus (SMO-01 special model by ULVAC, Inc.)
Target composition: Ti
Target size: Φ4 inches
Sputtering gas: Ar 70 sccm, 0.45 Pa
Sputtering power: 1000 W (DC)
Film thickness: 100 nm
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$ and Ni
Target size: Φ4 inches
Sputtering gas: Ar (80%) +$O_2$ (20%) 20 sccm, 0.20 Pa
Sputtering power: $Li_3PO_4$ 600 W (RF), Ni 150 W (DC)
Film thickness: 329 nm
(Solid Electrolyte Film)
The solid electrolyte film 50 was formed by the following sputtering apparatus under the following film-forming conditions.
Sputtering apparatus (SMO-01 special model by ULVAC, Inc.)
Target composition: $Li_3PO_4$
Target size: Φ4 inches
Sputtering gas: Ar (80%) +$O_2$ (20%) 20 sccm, 0.20 Pa
Sputtering power: 600 W (RF)
Film thickness: 400 nm
(Li Film)
Bell-jar type resistance heating evaporation apparatus
Deposition source: Li
Deposition rate: 5.08 nm/sec, ultimate vacuum: 0.004 Pa
Film thickness: 1000 nm In Sample 3, after production, Li of the Li film was actively inserted into the $Li_{2.4}Ni_{6.9}PO_{6.4}$ film with a repetition of charging and discharging in the same manner as in Test example 3, and finally, discharge curves, in which the specific capacity (mAh/g) and the composition ratio x of lithium of $Li_xCu_{2.8}PO_4$ are taken along their respective abscissae, were to be obtained. These discharge curves are shown in FIGS. 23A and 23B.

Figure 23:
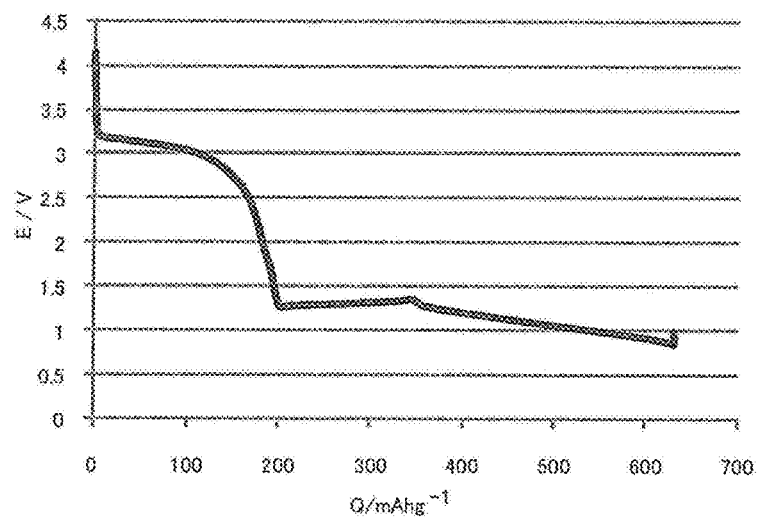
FIG. 23A is a graph showing a discharge curve for Sample 3 where the specific capacity (mAh/g) is taken along the abscissa.
FIG. 23B is a graph showing a discharge curve for Sample 3, where the composition ratio x of lithium of $Li_xNi_{6.9}PO_{6.4}$ is taken along the abscissa.
Figure 23:
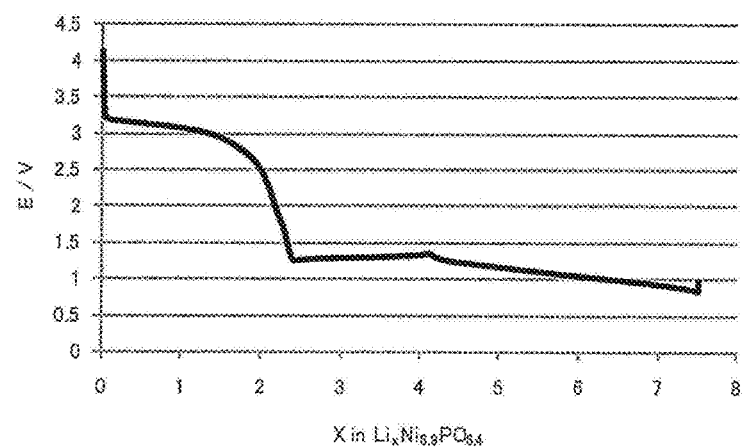

As shown in FIG. 23, this $Li_xCu_{6.9}PO_{6.4}$ could be shown to be a high-capacity positive electrode active material component in which Li can be inserted up to x=8 approximately.

Examples 7 and 8, Reference Example 2

Example 7

A solid electrolyte cell was produced in the same manner as in Example 1 except that the positive electrode active material film 40 and the negative electrode potential formation layer 64 were formed under the following film-forming conditions.
(Positive Electrode Active Material Film)
The positive electrode active material film was formed by the following sputtering apparatus under the following film-forming conditions.
Sputtering apparatus (C-3103 by ANELVA)
Target composition: co-sputtering of $Li_3PO_4$, $LiNiO_2$ and Cu
Target size: Φ6 inches
Sputtering gas: Ar (80%) +$O_2$ (20%) 15 sccm, 0.20 Pa
Sputtering power: $Li_3PO_4$ 700 W (RF), $LiNiO_2$ 700 W (RF), Cu 21 W (DC)
Film thickness: 300 nm
(Negative Electrode Potential Formation Layer 64)
The negative electrode potential formation layer 64 was formed by the following sputtering apparatus under the following film-forming conditions.
Sputtering apparatus (C-3103 by ANELVA)
Target composition: $LiNiO_2$
Target size: Φ6 inches
Sputtering gas: (Ar 80%+$O_2$ 20% mixture gas) 15 sccm, 0.20 Pa
Sputtering power: 1000 W (RF)
Film thickness: 6 nm Example 8

A solid electrolyte cell was produced in the same manner as in Example 1 except that the positive electrode active material film 40 and the negative electrode potential formation layer 64 were formed under the following film-forming conditions.
(Positive Electrode Active Material Film)
The positive electrode active material film was formed by the following sputtering apparatus under the following film-forming conditions.
Sputtering apparatus (C-3103 by ANELVA)
Target composition: co-sputtering of $Li_3PO_4$ and $LiNiO_2$
Target size: Φ6 inches
Sputtering gas: Ar (80%) +$O_2$ (20%) 15 sccm, 0.20 Pa
Sputtering power: $Li_3PO_4$ 700 W (RF), $LiNiO_2$ 700 W (RF)
Film thickness: 300 nm (Negative Electrode Potential Formation Layer 64)

The negative electrode potential formation layer 64 was formed by the following sputtering apparatus under the following film-forming conditions.
Sputtering apparatus (C-3103 by ANELVA)
Target composition: $LiNiO_2$
Target size: Φ6 inches
Sputtering gas: (Ar 80%+$O_2$ 20% mixture gas) 15 sccm, 0.20 Pa
Sputtering power: 1000 W (RF)
Film thickness: 5 nm Reference Example 2

A solid electrolyte cell was produced in the same manner as in Example 1 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (C-3103 by ANELVA)
Target composition: co-sputtering of $Li_3PO_4$ and Cu
Target size: Φ6 inches
Sputtering gas: Ar (80%) +$O_2$ (20%) 20 sccm, 0.20 Pa
Sputtering power: $Li_3PO_4$ 1000 W (RF), Cu 54 W (DC)
Film thickness: 300 nm
(Charge-Discharge Test)

Figure 24:
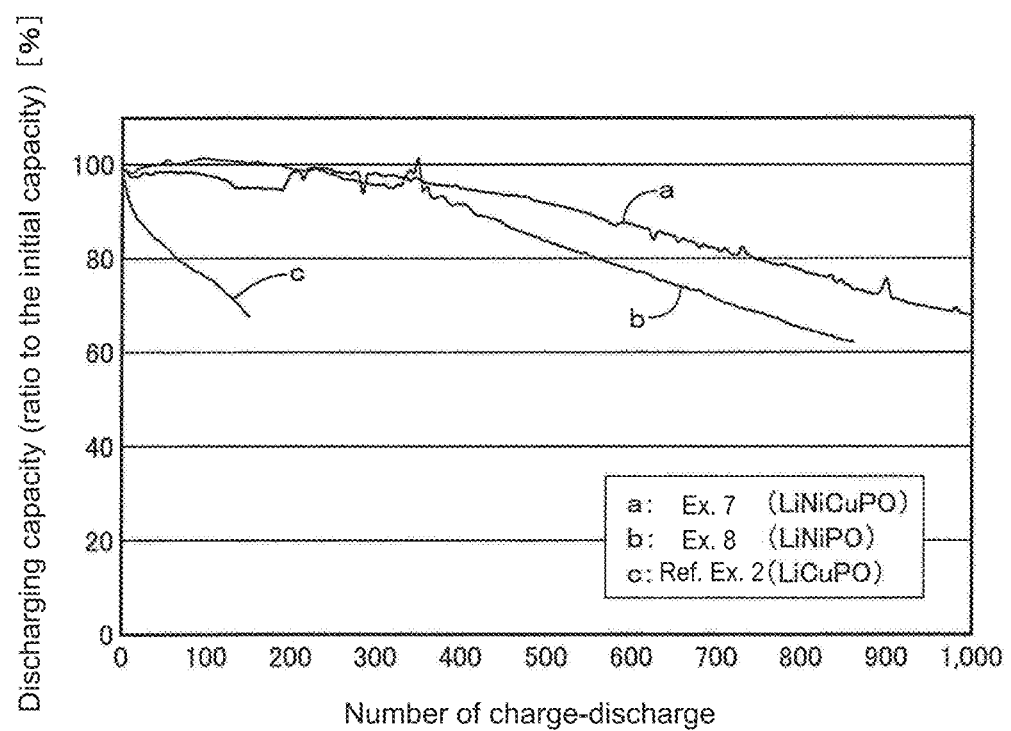
FIG. 24 is a graph showing charge-discharge curves for Examples 7, 8 and Reference Example 2.

Each of the solid electrolyte cells of Examples 7, 8 and Reference Example 2, was subjected to a charge-discharge test. Charging was performed at the charge current given (Example 7: 90 μA (8.8 C), Example 8: 64 μA (6.2 C), Reference Example 2: 32 μA (4.9 C)). Discharging was performed at the discharge current given (Example 7: 90 μA (8.8 C), Example 8: 64 μA (6.2 C), Reference Example 2: 32 μA (4.9 C)). Each charge cutoff voltage and discharge cutoff voltage was set to a predetermined voltage for each of the Examples and Reference Example as appropriate. Repeating the above charging and discharging, the discharging capacity (ratio of the discharging capacity to the initial capacity (discharging capacity in the first discharging)) was plotted against the number of charge-discharge. The measurement results are shown in FIG. 24. In FIG. 24, the line a shows the measurement result of Example 7, the line b shows the measurement result of Example 8, and the line c shows the measurement result of Reference Example 2. In FIG. 24, LiCuPO is an abbreviation for the lithium phosphate compound containing Li, P, Cu and O. LiNiPO is an abbreviation for the lithium phosphate compound containing Li, P, Ni and O. LiNiCuPO is an abbreviation for the lithium phosphate compound containing Li, P, Cu, Ni and O.

As shown in FIG. 24, Example 7, in which the positive electrode active material film was made up with a lithium phosphate compound containing Cu and Ni as elements other than Li, P and O, is superior in durability (charge-discharge cycle characteristics) compared to Example 8 or Reference Example 2, in which the positive electrode active material film was made up with a lithium phosphate compound containing Cu alone as an element other than Li, P and O, or a lithium phosphate compound containing Ni alone as an element other than Li, P and O. That is, the lithium phosphate compound containing two appropriate metal elements as elements other than Li, P and O was confirmed to be a positive electrode active material with better characteristics.

Examples 9 to 12

Example 9

A solid electrolyte cell was produced in the same manner as in Example 1 except that the positive electrode active material film 40 was formed under the following film-forming conditions. In the positive electrode active material film to be formed, the composition of Al may be one such that an amount of Al proportional to the sputtering power was added. In this case, the sputtering power for Al was about ¼ of the sputtering power for Ni, and thus Al of about ¼ of Ni is considered to have been added to the positive electrode active material film.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Ni and Al
Target size: Φ4 inches
Sputtering gas: Ar (80%) +$O_2$ (20%) 20 sccm, 0.20 Pa
Sputtering power: $Li_3PO_4$ 600 W (RF), Ni 130 W (DC), Al 30 W (DC)
Film thickness: 640 nm
(Charge-Discharge Test)

Figure 25:
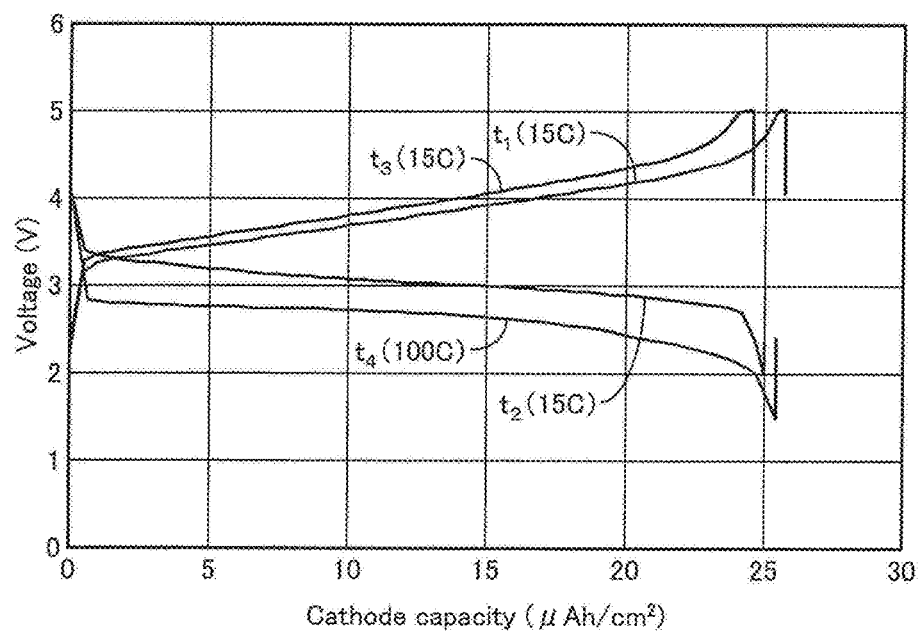
FIG. 25 is a graph showing charge-discharge curves for Example 9.

The solid electrolyte cell of Example 9 was subjected to a charge-discharge test in the same manner as in Example 4. The charge-discharge curves are shown in FIG. 25. In FIG. 25, the lines $t_1$ to $t_4$ each show the charge curve or discharge curve obtained under the following charge-discharge conditions.
Line $t_1$: charge current 200 μA (15 C), charge cutoff voltage 5V;
Line $t_2$: discharge current 200 μA (15 C), discharge cutoff voltage 2V;
Line $t_3$: charge current 200 μA (15 C), charge cutoff voltage 5V;
Line $t_4$: discharge current 1400 μA (100 C), discharge cutoff voltage 1.5V.

As indicated by the discharge curve of 15 C and the discharge curve of 100 C, in the lithium phosphate compound containing Li, P, Ni, the additive element M3 (Al) and O, the discharge rate was very high. Further, a sufficiently high discharge voltage was being maintained even during the fast discharge of 100 C, the discharging capacity about the same as the charging capacity was obtained, and good charge-discharge efficiency was being maintained also in the fast discharge.

Example 10

Figure 26:
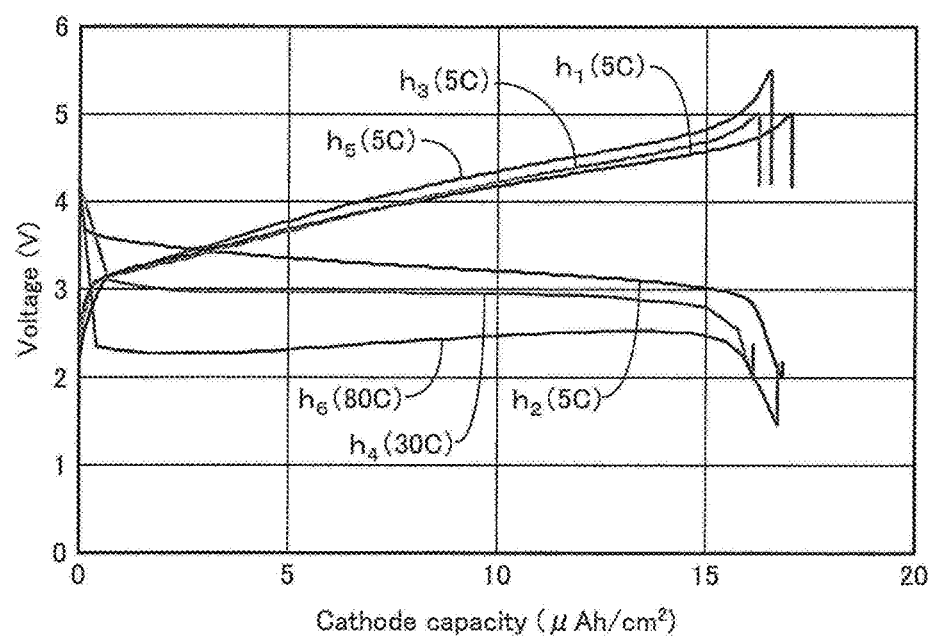
FIG. 26 is a graph showing charge-discharge curves for Example 10.

A solid electrolyte cell was produced in the same manner as in Example 1 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$ and Ni
Target size: Φ4 inches
Sputtering gas: Ar (80%) +$O_2$ (20%) 20 sccm, 0.20 Pa
Sputtering power: $Li_3PO_4$ 600 W (RF), Ni 150 W (DC)
Film thickness: 330 nm The solid electrolyte cell of Example 10 was subjected to a charge-discharge test. Charging was performed at low rate as in Example 9. Since the film thickness of the positive electrode active material of Example 10 is smaller than that of Example 9, and the impedance in Example 10 is higher, the charge current was set to 50 μA. To this charge current, the discharge current was varied in three types, which were 50 μA, 300 μA and 800 μA. Each of these is equivalent to about 5 C, 30 C and 80 C, in this order. The charge-discharge curves are shown in FIG. 26. In FIG. 26, the lines $h_1$ to $h_6$ each show the charge curve or discharge curve obtained under the following charge-discharge conditions.

Line $h_1$: charge current 50 μA (5 C), charge cutoff voltage 5V;
Line $h_2$: discharge current 50 μA (5 C), discharge cutoff voltage 2V;
Line $h_3$: charge current 50 μA (5 C), charge cutoff voltage 5V;
Line $h_4$: discharge current 300 μA (30 C), discharge cutoff voltage 2V;
Line $h_5$: charge current 50 μA (5 C), charge cutoff voltage 5.5V;
Line $h_6$: discharge current 800 μA (80 C), discharge cutoff voltage 1.4V.

As shown in FIG. 26, in the discharging of up to the equivalent of 30 C, the discharge voltage was stable during discharging, which provides practicality. However, in the discharging of 80 C, a phenomenon in which the potential becomes decreased to almost 2V in the early stage of discharging, and the potential increases slightly when the discharging progresses, was observed. This was caused by a potential drop due to the internal impedance. Since the film thickness of the positive electrode active material in Example 10 was smaller than Example 9, Example 10 was in a situation less likely to be affected by the impedance. In this situation, the result was that there was a larger potential drop in Example 10. That is, by a comparison of Example 9 which used the lithium phosphate compound containing Li, P, Ni, the additive element M3 (Al) and O, and Example 10 which used the lithium phosphate compound containing Li, P, Ni and O; an effect of allowing a lithium phosphate compound to contain the additive element M3 (Al) in addition to Ni could be clearly observed.

Example 11

A solid electrolyte cell was produced in the same manner as in Example 1 except that the positive electrode active material film 40 was formed under the following film-forming conditions. In Example 11, a target being used in place of $Li_3PO_4$ was one that has the same composition of Al, Ti, P and O as in LATP ($Li_{1.3}Al_{0.3}Ti_{1.7}(PO_4)_3$), which is known as a typical solid electrolyte. That is, a sintered body of $(Li_3PO_4)_3Al_{0.3}Ti_{1.7}$ was used. Ti and Al were thus added into a lithium phosphate compound containing Li, P, Ni and O, and as the composition of Ni was at least twice larger, up to ten times larger than P, both Ti and Al were added in a trace amount. Besides, as the amount of Al was equal to or less than ⅕ of the amount of Ti, Ti was the main additive in the lithium phosphate compound which makes up the positive electrode active material film 40 of Example 11.

Figure 27:
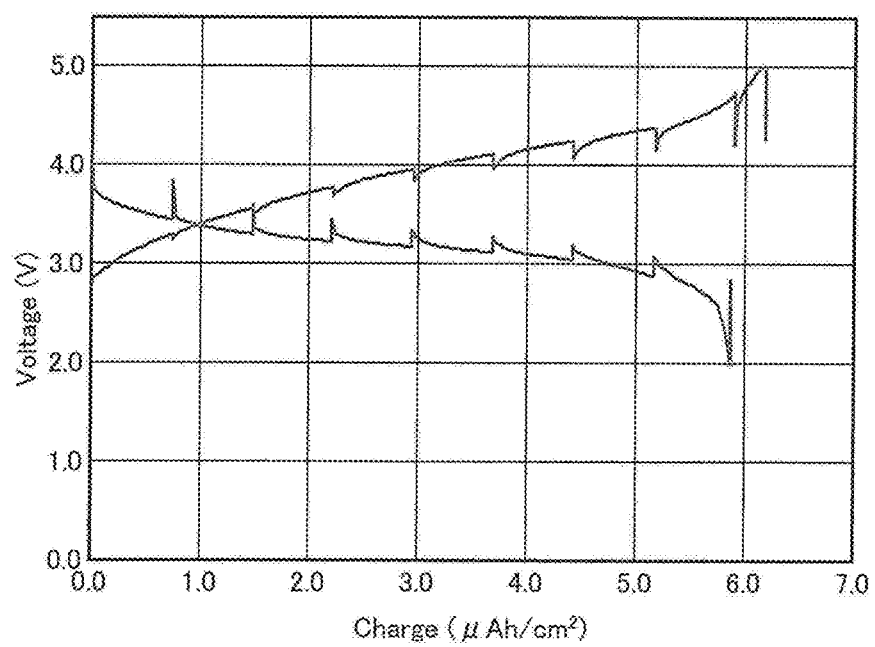
FIG. 27 is a graph showing charge-discharge curves for Example 11.

(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $(Li_3PO_4)_3Al_{0.3}Ti_{1.7}$ (LATP) and Ni
Target size: Φ4 inches
Sputtering gas: Ar (80%) +$O_2$ (20%) 20 sccm, 0.20 Pa
Sputtering power: LATP 600 W (RF), Ni 150 W (DC)
Film thickness: 74 nm
(Intermittent Charging and Discharging)
At the time of charging and discharging, intermittent charging and discharging was carried out, and changes in the potential at OCV (open circuit voltage) were observed. The conditions thereof were as follows. After the cell was charged or discharged (CC current driven) for 30 seconds, the charge current or discharge current was stopped, and in that state, the potential was measured for 5 minutes. Subsequently, a charge current or discharge current was allowed to flow, and was stopped after 30 seconds. This was repeated successively until the termination conditions of charging or discharging. At this time, a change in the potential after the current was stopped is considered to be the internal resistance (internal impedance) that was applied to the inside of the battery during charging or discharging, which would be one of the causes of decrease in the discharge voltage. That is, a smaller internal resistance results in higher discharge potential and thus is desirable for practical use. FIG. 27 shows the charge-discharge curves for Example 11.

As shown in FIG. 27, the change in the potential at OCV when the charge and discharge current was stopped was particularly small in the early stage of charging and especially near the termination of discharging. From that the internal impedance was low, the advantages that the energy loss due to Joule heat is small during charging, and that the discharge voltage is high during discharging, were able to be confirmed.

Example 12

Figure 28:
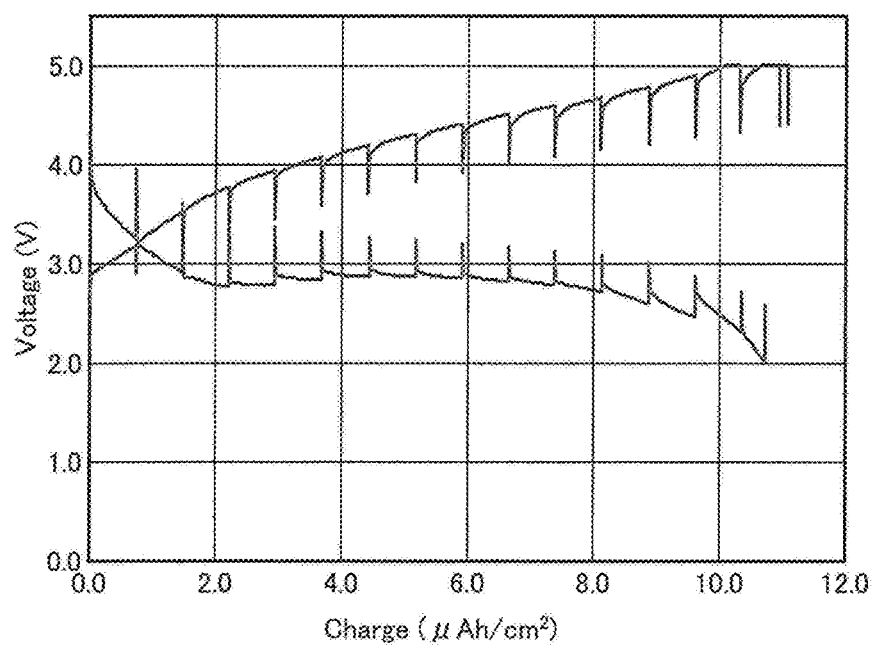
FIG. 28 is a graph showing charge-discharge curves for Example 12.

A solid electrolyte cell was produced in the same manner as in Example 1 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$ and Ni
Target size: Φ4 inches
Sputtering gas: Ar (80%) +$O_2$ (20%) 20 sccm, 0.20 Pa
Sputtering power: $Li_3PO_4$ 600 W (RF), Ni 150 W (DC)
Film thickness: 94 nm
(Intermittent Charging and Discharging)
Intermittent charging and discharging was carried out under the same conditions as in Example 11, and changes in the potential at OCV (open circuit voltage) were observed. FIG. 28 shows the charge-discharge curves for Example 12. As shown in FIG. 28, it was clear that the change in voltage at the time of the intermittent charging and discharging was larger, and that the internal impedance was higher, in Example 12, compared to Example 10. Further, this resulted in lowering of the discharge potential by about 0.5V on the whole. Therefore, by a comparison of Example 11 which used the lithium phosphate compound containing Li, P, Ni, the additive elements M3 (Al and Ti) and O, and Example 12 which used the lithium phosphate compound containing Li, P, Ni and O; an effect of allowing a lithium phosphate compound to contain the additive elements M3 (Al and Ti) in addition to Ni could be clearly observed.

Reference Example 3, Examples 13 to 15

Reference Example 3

The negative electrode potential formation layer 64 was not formed. The positive electrode active material film was formed under the following film conditions. Except the above, a solid electrolyte cell was produced in the same manner as in Example 1.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$ and Cu
Target size: Φ4 inches
Sputtering gas: Ar (80%) +$O_2$ (20%) 20 sccm, 0.20 Pa
Sputtering power: $Li_3PO_4$ 1 kW (RF), Cu 65 W (DC)
Film thickness: 300 nm Example 13

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and ZnO
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), ZnO 380 W (RF)
Film thickness: 300 nm Example 14

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and Pd
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), Pd 50 W (RF)
Film thickness: 300 nm Example 15

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and Au
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), Au 60 W (RF)
Film thickness: 300 nm
(Charge-Discharge Test)
Each of the solid electrolyte cells of Examples 13 to 15 and Reference Example 3, was subjected to a charge-discharge test. Charging was performed at a charge current of 32 μA, and discharging was performed at a discharge current of 32 μA. Each charge cutoff voltage and discharge cutoff voltage was set to a predetermined voltage for each of the Examples and Reference Example as appropriate. Repeating the above charging and discharging, the discharging capacity (ratio of the discharging capacity to the initial capacity) was plotted against the number of charge-discharge. The measurement results are shown in FIG. 29.

Figure 29:
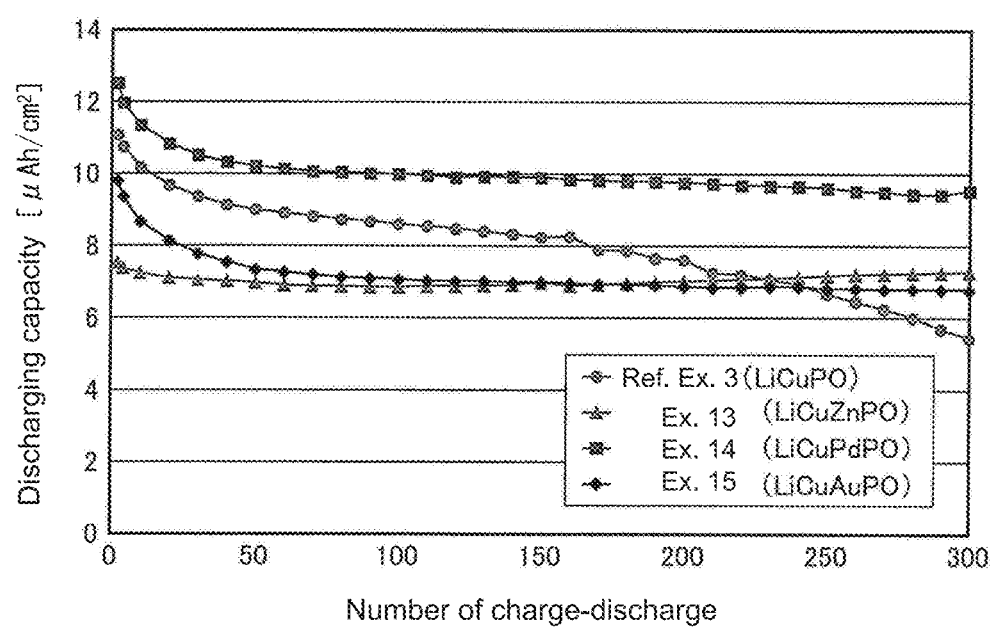
FIG. 29 is a graph plotting the discharging capacity versus the number of charge-discharge for Examples 13 to 15 and Reference Example 3.

As shown in FIG. 29, Example 14, in which the positive electrode active material film was made up with a lithium phosphate compound containing Li, P, Ni, Au and O, was with good repetitive charge-discharge characteristics (charge-discharge cycle characteristics) compared to Reference Example 3, in which the positive electrode active material film was made up with a lithium phosphate compound containing Li, P and Cu. Example 15, in which the positive electrode active material film was made up with a lithium phosphate compound containing Li, P, Cu, Pd and O, was with larger initial capacity and good repetitive charge-discharge characteristics (charge-discharge cycle characteristics) compared to the Example in which the positive electrode active material film was made up with a lithium phosphate compound containing Li, P, Cu and O. Further, Example 13, in which the positive electrode active material film was made up with a lithium phosphate compound containing Li, P, Cu, Zn (the additive element M3) and O, was with good repetitive charge-discharge characteristics (charge-discharge cycle characteristics) compared to the Reference Example, in which the positive electrode active material film was made up with a lithium phosphate compound containing Li, P, Cu and O.

Examples 16 to 23

Example 16

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and V
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), V 650 W (RF)
Film thickness: 300 nm

Example 17

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and Cr
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), Cr 300 W (RF)
Film thickness: 300 nm

Example 18

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and $HfO_2$
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), $HfO_2$ 600 W (RF)
Film thickness: 300 nm

Example 19

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and W
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), W 70 W (RF)
Film thickness: 300 nm

Example 20

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and $Ga_2O_2$
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), $Ga_2O_3$ 400 W (RF)
Film thickness: 300 nm

Example 21

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and $In_2O_3$
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), $In_2O_2$ 200 W (RF)
Film thickness: 300 nm

Example 22

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and SnO
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), SnO 100 W (RF)
Film thickness: 300 nm

Example 23

A solid electrolyte cell was produced in the same manner as in Reference Example 3 except that the positive electrode active material film 40 was formed under the following film-forming conditions.
(Positive Electrode Active Material Film)
The positive electrode active material film was formed by the following sputtering apparatus under the following film-forming conditions.
Sputtering apparatus (SMO-01 special model by ULVAC, Inc.)
Target composition: co-sputtering of $Li_3PO_4$, Cu and Sb
Target size: Φ4 inches
Sputtering gas: Ar (80%) +$O_2$ (20%) 20 sccm, 0.20 Pa
Sputtering power: $Li_3PO_4$ 1 kW (RF), Cu 43 W (DC), Sb 50 W (RF)
Film thickness: 300 nm (Charge-Discharge Test)

Figure 30:
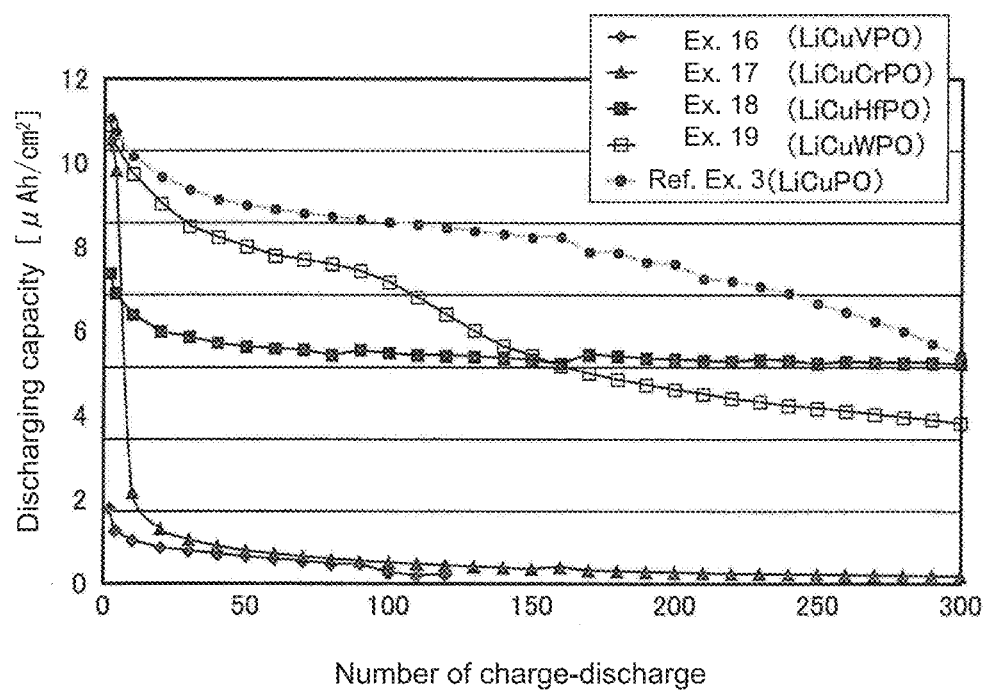
FIG. 30 is a graph plotting the discharging capacity versus the number of charge-discharge for Examples 16 to 19 and Reference Example 3.
Figure 31:
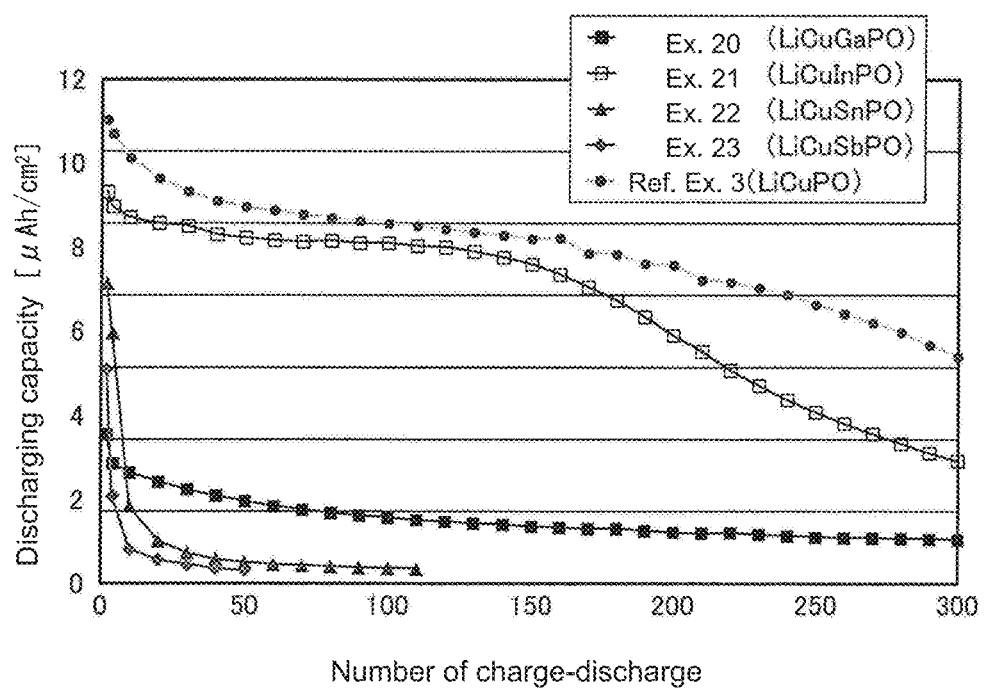
FIG. 31 is a graph plotting the discharging capacity versus the number of charge-discharge for Examples 20 to 23 and Reference Example 3.

Each of the solid electrolyte cells of Examples 16 to 23 was subjected to a charge-discharge test. Charging was performed at a charge current of 32 µA, and discharging was performed at a discharge current of 32 µA. Each charge cutoff voltage and discharge cutoff voltage was set to a predetermined voltage for each of the Examples and Reference Example as appropriate. Repeating the above charging and discharging, the discharging capacity (ratio of the discharging capacity to the initial capacity) was plotted against the number of charge-discharge. The measurement results are shown in FIGS. 30 and 31. As a reference, the measurement results for Reference example 3 are also shown.

As shown in FIGS. 30 and 31, according to Examples 16 to 23, in the solid electrolyte cells which include the positive electrode active material film made up with a lithium phosphate compound containing, as the additive element M3, each of Cr, V, Hf, W, Ga, In, Sn and Sb, an improvement effect by the additive element M3 was small. In particular, in cases of Cr, V, Ga, Sn and Sb, the improvement effect could not be seen. On the other hand, the driving of the cell was maintained in any of these Examples; especially in the solid electrolyte cells which include the positive electrode active material film made up with a lithium phosphate compound containing W, Cr or In, the initial capacity was high, which may be able to provide an improvement effect by adjusting the composition.

(Capacity of Positive Electrode Active Material in Examples 7, 14, 17 and 19)

In addition, for ease of comparing the capacities of the positive electrode active materials, an initial capacity of the positive electrode active material, which is calculated on the basis of the discharging capacity upon the first charging and discharging and the film density of the positive electrode active material film, is shown in Table 2 for Examples 7, 14, 17 and 19. Examples 7, 14, 17 and 19 are those of Examples 7 to 19 which showed relatively high capacity. In Table 2, LiCuMPO is an abbreviation for the lithium phosphate compound containing Li, P, Cu, an element M (Ni, Pd, Cr or W) and O.

TABLE 2

|  | LiCuMPO | Initial capacity of the positive electrode active material (mAh/g) |
|---|---|---|
| Ex. 7 | LiCuNiPO | 80 |
| Ex. 14 | LiCuPdPO | 120 |
| Ex. 17 | LiCuCrPO | 190 |
| Ex. 19 | LiCuWPO | 135 |

3. Other Embodiments

The present technology is not limited to the above-described embodiments thereof, and various modifications and applications are possible within the scope without departing from the gist of the present technology. For example, the film configuration of the solid electrolyte cell is not limited to the above-described. For example, configurations obtained by omitting the inorganic insulating film from the first and second embodiments may be adopted. A configuration obtained by omitting the negative electrode potential formation layer film from the first embodiment may be adopted.

Further, a configuration in which a plurality of stacked bodies are formed being stacked sequentially, electrically connected in series with one another and are covered by the overall protective film 80, may be adopted. Besides, a configuration in which a plurality of stacked bodies are formed being juxtaposed on a substrate, electrically connected in parallel or in series with one another, and are covered by the overall protective film 80, may be adopted.

In addition, for example, the structure of the solid electrolyte cell is not limited to the above-described cases. For example, the present technology is also applicable to a solid electrolyte cell having a structure in which a conductive material is used for the substrate 10 and the positive electrode current collector film 30 is omitted, and the like. Further, for example, the positive electrode side current collector film 30 may be made up with a metallic plate made of a positive electrode current collector material. The negative electrode side current collector film 70 may be made up with a metallic plate made of a negative electrode current collector material as well.

The amorphous positive electrode active material ingredient according to the present technology costs lower for material, and is not necessary to be annealed. Thus, manufacturing costs are inexpensive, a degree of freedom of manufacturing can be greater, and this is also applicable for uses such as surface coating of fine particles in addition to thin-film cells.

In addition, the present technology can employ the following configurations.

(1)

A solid electrolyte cell, including:
a positive electrode active material; and
a solid electrolyte;
which positive electrode active material includes an amorphous-state lithium phosphate compound containing Li; P; an element M1 selected from Ni, Co, Mn, Au, Ag and Pd; and O.

(2)

The solid electrolyte cell according to (1), in which
the lithium phosphate compound is one which further contains at least one element M2 selected from Ni, Co, Mn, Au, Ag, Pd and Cu (provided M1≠M2).

(3)

The solid electrolyte cell according to (2), in which
the lithium phosphate compound is one which further contains at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr.

(4)

The solid electrolyte cell according to (1), in which
the lithium phosphate compound is one represented by Formula (1),
which Formula (1) is $Li_xNi_yPO_z$
(where x represents the composition ratio of lithium; y represents the composition ratio of nickel; x is $0<x<8.0$; y is $2.0 \leq y \leq 10$; z represents the composition ratio of oxygen; and z is the ratio in which oxygen is stably contained depending on the composition ratio of Ni and P).

(5)

The solid electrolyte cell according to (1), including:
a positive electrode active material layer containing the positive electrode active material; and
a solid electrolyte layer containing the solid electrolyte.

(6)

The solid electrolyte cell according to (5), including:
a positive electrode side layer having the positive electrode active material layer; and
a negative electrode side layer;
the solid electrolyte layer being located between the positive electrode side layer and the negative electrode side layer.

(7)
The solid electrolyte cell according to (6), in which
the negative electrode side layer is made up with a negative electrode current collector layer and a negative electrode side potential formation layer, and
at the time of charging, a lithium excess layer is formed at an interface on the negative electrode side of the solid electrolyte layer.

(8)
The solid electrolyte cell according to (6) or (7), in which
the positive electrode side layer is made up with the positive electrode active material layer and a positive electrode current collector layer.

(9)
The solid electrolyte cell according to (6) or (8), in which
the negative electrode side layer is made up with a negative electrode current collector layer, and
at the time of charging, a lithium excess layer is formed at an interface on the negative electrode side of the solid electrolyte layer.

(10)
The solid electrolyte cell according to any one of (6) to (9), further including a substrate;
on which substrate, a stacked body including the positive electrode side layer, the negative electrode side layer and the solid electrolyte layer is formed.

(11)
The solid electrolyte cell according to (10), in which
the substrate is a resin substrate.

(12)
The solid electrolyte cell according to any one of (5) to (11), in which
at least the positive electrode active material layer is formed by a thin film.

(13)
The solid electrolyte cell according to any one of (6) to (12), in which
the positive electrode side layer, the negative electrode side layer and the solid electrolyte layer are formed by thin films.

(14)
A positive electrode active material, including:
a lithium phosphate compound containing Li; P; an element M1 selected from Ni, Co, Mn, Au, Ag, and Pd; and O;
the lithium phosphate compound being in an amorphous state.

(15)
A solid electrolyte cell, including:
a positive electrode active material; and
a solid electrolyte;
which positive electrode active material includes an amorphous-state lithium phosphate compound containing Li; P; an element M1' selected from Ni, Co, Mn, Au, Ag, Pd and Cu; at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr; and O.

(16)
A positive electrode active material, including:
a lithium phosphate compound containing Li; P; an element M1' selected from Ni, Co, Mn, Au, Ag, Pd and Cu; at least one additive element M3 selected from B, Mg, Al, Si, Ti, V, Cr, Fe, Zn, Ga, Ge, Nb, Mo, In, Sn, Sb, Te, W, Os, Bi, Gd, Tb, Dy, Hf, Ta and Zr; and O;
the lithium phosphate compound being in an amorphous state.

(17)
A solid electrolyte cell, including:
a positive electrode active material; and
a solid electrolyte;
which positive electrode active material includes an amorphous-state lithium phosphate compound,
the lithium phosphate compound being one represented by Formula (2),
which Formula (2) is $Li_xCu_yPO_4$
(where x represents the composition ratio of lithium; y represents the composition ratio of copper; and x is $5.0<x<7.0$).

(18)
A positive electrode active material, including:
a lithium phosphate compound represented by Formula (2),
which lithium phosphate compound is in an amorphous state;
where Formula (2) is $Li_xCu_yPO_4$
(where x represents the composition ratio of lithium; y represents the composition ratio of copper; and x is $5.0<x<7.0$).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF REFERENCE NUMERALS

10 substrate
20 inorganic insulating film
30 positive electrode side current collector film
40 positive electrode active material film
50 solid electrolyte film
60 negative electrode active material film
64 negative electrode potential formation layer
70 negative electrode side current collector film
80 overall protective film

The invention claimed is:

1. A solid electrolyte cell, comprising:
a positive electrode active material; and
a solid electrolyte;
wherein the positive electrode active material includes:
an amorphous-state lithium phosphate compound containing Li; P; an element M1 selected from Ni, Au, Ag and Pd; and O,
at least one element M2 selected from Ni, Co, Mn, Au, Ag, Pd and Cu (provided M1≠M2), and
at least one element M3 selected from B, Mg, Al, Ga, Ge, In, Sn, Sb and Bi.

2. The solid electrolyte cell according to claim 1,
wherein the lithium phosphate compound is represented by $Li_xNi_yPO_4$, and
wherein x represents the composition ratio of lithium; y represents the composition ratio of nickel; x is $0<x<8.0$; and y is $2.0≤y≤10$.

3. The solid electrolyte cell according to claim 1, comprising:
a positive electrode active material layer containing the positive electrode active material; and
a solid electrolyte layer containing the solid electrolyte.

4. The solid electrolyte cell according to claim 3, comprising:

a positive electrode side layer having the positive electrode active material layer; and a negative electrode side layer;

the solid electrolyte layer being located between the positive electrode side layer and the negative electrode side layer.

5. The solid electrolyte cell according to claim 4, wherein the negative electrode side layer is made up with a negative electrode current collector layer and a negative electrode side potential formation layer, and at the time of charging, a lithium excess layer is formed at an interface on the negative electrode side of the solid electrolyte layer.

6. The solid electrolyte cell according to claim 4, wherein the positive electrode side layer is made up with the positive electrode active material layer and a positive electrode current collector layer.

7. The solid electrolyte cell according to claim 4, wherein the negative electrode side layer is made up with a negative electrode current collector layer, and at the time of charging, a lithium excess layer is formed at an interface on the negative electrode side layer of the solid electrolyte layer.

8. The solid electrolyte cell according to claim 4, further comprising a substrate, wherein a stacked body including the positive electrode side layer, the negative electrode side layer and the solid electrolyte layer are formed on the substrate.

9. The solid electrolyte cell according to claim 8, wherein the substrate is a resin substrate.

10. The solid electrolyte cell according to claim 4, wherein the positive electrode side layer, the negative electrode side layer and the solid electrolyte layer are formed by thin films.

11. The solid electrolyte cell according to claim 3, wherein at least the positive electrode active material layer is formed by a thin film.

12. A positive electrode active material, comprising:

a lithium phosphate compound containing Li; P; an element M1 selected from Au, Ag, and Pd; and O;

at least one element M2 selected from Ni, Co, Mn, Au, Ag, Pd and Cu (provided M1≠M2); and at least one element M3 selected from B, Mg, Al, Ga, Ge, In, Sn, Sb and Bi, wherein the lithium phosphate compound is in an amorphous state.

* * * * *